(12) United States Patent
Shinozaki et al.

(10) Patent No.: US 7,057,789 B2
(45) Date of Patent: Jun. 6, 2006

(54) DISPLAY ELEMENT

(75) Inventors: Kenji Shinozaki, Tokyo (JP); Hiroyuki Mitsuhashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/482,935

(22) PCT Filed: Jul. 3, 2002

(86) PCT No.: PCT/JP02/06756

§ 371 (c)(1),
(2), (4) Date: Jun. 22, 2004

(87) PCT Pub. No.: WO03/005117

PCT Pub. Date: Jan. 16, 2003

(65) Prior Publication Data

US 2004/0241517 A1 Dec. 2, 2004

(30) Foreign Application Priority Data

Jul. 6, 2001 (JP) .............................. 2001-206105

(51) Int. Cl.
*G02F 1/15* (2006.01)
(52) U.S. Cl. .................................... 359/265
(58) Field of Classification Search ................ 359/265, 359/266, 267, 268, 269, 270, 271, 272, 273, 359/274, 275
See application file for complete search history.

(56) References Cited

U.S. PATENT DOCUMENTS

| | | | | |
|---|---|---|---|---|
| 4,448,493 A | * | 5/1984 | Matsudaira et al. | 359/268 |
| 4,940,315 A | * | 7/1990 | Demiryont | 359/267 |
| 6,165,388 A | * | 12/2000 | Coleman | 252/520.1 |
| 6,657,768 B1 | * | 12/2003 | Nishikitani et al. | 359/265 |

FOREIGN PATENT DOCUMENTS

| | | |
|---|---|---|
| JP | 64-59338 | 3/1989 |
| JP | 3-287132 | 12/1991 |
| JP | 11-95265 | 4/1999 |

* cited by examiner

*Primary Examiner*—Hung X. Dang
*Assistant Examiner*—Tuyen Tra
(74) *Attorney, Agent, or Firm*—Sonnenschein, Nath & Rosenthal LLP

(57) ABSTRACT

A display element not causative of crosstalk, ensures sharp display, and can be driven at a low energy is disclosed. In the display element (18), a polymer solid electrolyte layer (5) which contains a colorant material such as bismuth chloride or AgI, capable of causing deposition, dissolution or color change based on electrochemical reduction or oxidation, is disposed between transparent pixel electrodes (2) and opposing electrodes (6), and at least the transparent pixel electrodes (2) are covered with an insulating material (14b) in an area exclusive of at least pixel portions (17).

20 Claims, 12 Drawing Sheets

ELECTRO-CHEMICAL DEPOSITION IN HERE

DISPLAY ELEMENT

BACKGROUND OF THE INVENTION

The present invention relates to a display element using a display material capable of causing deposition, dissolution or color change based on, for example, electrochemical reduction or oxidation.

With recent dissemination of network, there are increasing trends in distributing various documents in a form of so-called electronic document, instead of in a conventional form of printed matter. Also books and magazines are becoming more frequently distributed through electronic publishing.

A conventional way for viewing these information is such as reading the information on cathode ray tubes (CRTs) or on liquid crystal displays (LCDs). It has, however, been pointed out that these light-emitting-type displays would make the users heavily tired due to reasons related to human engineering when they are watched for a long duration of time, and that they are not suitable for reading for a long duration of time. An additional disadvantage is that sites of reading are limited only at around places where computers with display devices are installed.

While recent dissemination of laptop computers made it possible to use some of them as mobile displays, they are still not suitable for reading for a long duration of time because they are intrinsically of light-emitting type and problems in power consumption remain unsolved.

Reflection-type, liquid-crystal displays recently developed seem to be driven at low power consumption, but a reflectivity of only as high as 30% or around is attainable for the blank display (white display). This results in only a far poorer visibility as compared with that of printing on paper, is more causative of fatigue, and is far from ensuring comfortable reading for a long duration of time.

To solve these problems, recent development has been directed to so-called, paper-like display or electronic paper. This type of medium usually develops color based on electrophoretic migration of colorant particles between electrodes, or rotation of dichroic particles in an electric field. These methods, however, have drawbacks in that they can attain only a poor contrast because the light is undesirably absorbed by gaps between the particles, and this makes it impossible to achieve a practical write speed (within one second) unless drive voltage is raised to as high as 100 V or above.

Electrochromic displays (ECD) are superior to any other systems described in the above in terms of contrast, and have already been put into practical use for auto-dimming glass or displays for watches and clocks.

The conventional configuration intended for use in displays such as the electronic paper always needed matrix driving. The conventional displays based on electro-chemical reaction, however, could not adopt the simple matrix system due to their large energy consumption for the driving, and instead the active matrix system have inevitably been adopted. This has consequently raised price of the display devices, so that there have been strong demands for the devices which can be driven based on the simple matrix system.

The present inventors found out an ion-conduction-type display element capable of developing color(s) based on a simple matrix system.

Configuration and functions of such a display element are as described below.

That is, ions will migrate towards either electrode with the aid of electric field energy at an electrode-intersecting area where the potential is selected, and the ions will cause reduction or oxidation reaction of the colorant material to thereby allowing it to deposit (reduction) from its ionized status or to elute (oxidation).

Thus deposited metal can be observed from the substrate side so as to form a predetermined pattern since the reflected light of the incident light show a sufficient contrast between colors ascribable to the metal and the background. As a consequence, reversible reaction between coloring and decoloring makes it possible to configure a desired reflection-type element. It is also possible to configure a transmission-type element in which the incident light is observed from the substrate side as the transmitted light (the same will apply hereinafter).

In this case, a metal-ion-containing polyvinyl alcohol or the like is suitable for assisting ion conduction, and bismuth chloride is preferably used as the metal ion.

The ion-conduction-type display element not only makes it possible to solve the problems which have resided in the conventional display elements, and to thin the display element enough to an extent that the display device is available as the electronic paper, but makes it operable also under conditions under the simple matrix driving.

Next paragraphs will describe an exemplary configuration of the ion-conduction-type display element.

As shown in FIGS. 12A, 12B and 13, transparent electrodes 62 which comprise an ITO (indium tin oxide) film are formed on a transparent support 61 such as glass substrate by vapor deposition or sputtering, and by succeeding patterning. The individual pixel portions 57 composed of the transparent pixel electrodes 62 are arranged so as to have a dot or matrix pattern on the transparent support 61.

On the transparent support 61, also a polymer solid electrolyte layer 65 is formed. A synthetic resin which serves as a matrix (base) polymer of the polymer solid electrolyte layer 65 and a material for composing the electrolyte are mixed first, and white particles as a colorant material was further dispersed therein, to thereby prepare a liquid, and the liquid of the polymer solid electrolyte is coated.

A support 67 having opposing electrodes 66 already formed thereon is then bonded with the transparent support 61 having the transparent pixel electrodes formed thereon 62, so as to hold the liquid of the polymer solid electrolyte in between on the opposing electrode 66 side. The stack is then dried and allowed to gelate, to thereby complete a display element 68 having the polymer solid electrolyte layer 65 and having a matrix electrode 21 configured therein.

Next, using the ion-conduction-type display element 68, metal ions for developing colors are allowed to diffuse and migrate in the polymer solid electrolyte layer 65 (ion conductor) towards the pixel portions 57 of the opposing transparent pixel electrodes 62 under the electric field applied by an arbitrary opposing electrode 66 on the support 67, to thereby allow the metal ions to deposit through reduction on the transparent pixel electrode 62 as shown in FIGS. 12A, 12B and 13. In this process, an ion diffusion range A is defined by a range allowing the ions to migrate almost normal to the isoelectric plane between the electrodes 66 and 62, and widening from the electrodes 66 at an angle θ of approximately 45° (the same will apply also hereinafter).

It is, however, anticipated that turning ON of both of $X_2$ electrode and $Y_2$ electrode in the electrodes 66 and 62, respectively, and consequent activation of the electric field (potential difference) at the intersection may sometimes result in a partial overlapping between an ion diffusion range ascribable to the electrodes $X_2$ and $Y_2$ (indicated by meshed solid lines) and an ion diffusion range ascribable to the electrodes $X_1$ and $Y_2$ (indicated by dashed lines) depending on the pitch or the like of the electrodes 66, and this may cause a crosstalk portion 69 due to color mixing between the adjacent pixel portions 57, and may make it difficult to produce a sharp display. It is also anticipated that a pixel portion in the electric field activated between the $X_1$ and $Y_2$ electrodes, for example, may slightly be colored due to ions diffused from the adjacent $X_2$ electrode.

The present invention was conceived after considering the aforementioned situations, and an object thereof is to provide a display element capable of ensuring a desirable coloring efficiency of the pixels, a sharp display without causing crosstalk, and simple matrix driving at low energies.

SUMMARY OF THE INVENTION

The present invention relates to a display element having a colorant material capable of causing deposition, dissolution or color change based on electrochemical reduction or oxidation and an electrolyte disposed between first electrodes and second electrodes, and at least either one of these electrodes is covered with an insulating material except an area of at least a pixel area.

The present invention relates also to a display element having a colorant material capable of causing deposition, dissolution or color change based on electrochemical reduction or oxidation and a polymer solid electrolyte disposed between first electrodes and second electrodes, and satisfying the relation below:

$$L \geq 2G$$

where, L represents the distance between the effective electrode planes of the adjacent first electrodes, and G represents the distance between the second electrode surface and the effective electrode plane of the first electrode.

In the display element of the present invention, at least either of the electrodes is covered with the insulating material in an area exclusive of at least the pixel area, and the distance L between the effective electrode planes of the adjacent first electrodes is set twice or more as large as the distance between the second electrode surface and the effective electrode planes of the first electrode. The insulating material can effectively prevent the ions to be diffused and migrated from the respective first electrode towards the second electrode from otherwise diffusing into the areas around the pixel area on the second electrode side, or can effectively prevent ions from invading the adjacent pixels.

This consequently ensures thorough coloring of the desired pixels, prevents overlapping of the ion diffusion ranges among the pixels, avoids unnecessary coloring of the pixels not desired to be colored, and ensures high-quality and sharp display without causing crosstalk and blurring (mixing) of colors.

Moreover, the coloring and decoloring are effected based on electrochemical reduction and oxidation of the colorant material between the first electrodes and second electrodes, and the polymer electrolyte can promote these changes and assist the ion transfer. This is successful in proceeding the coloring and decoloring in a rapid and thorough manner even under a low energy supply, raising the contrast and coloring density (black density, for example), avoiding problems in color fading or the like after a long-term use by virtue of the memory effect, and allowing not only active matrix driving but also simple matrix driving.

DETAILED DESCRIPTION OF THE PRESENTLY PREFERRED EMBODIMENTS

Figure 1A:
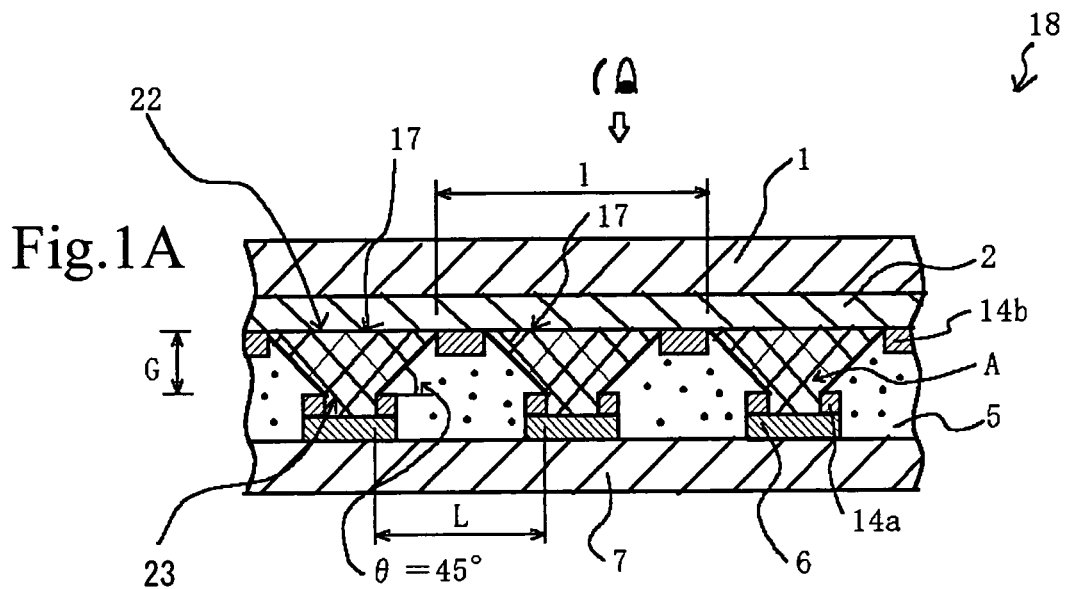
FIGS. 1A to 1C are sectional views of display elements of one embodiment of the present invention.

In the display element of the present invention in which the colorant material capable of causing deposition, dissolution or color change based on electrochemical reduction or oxidation and the polymer solid electrolyte are disposed between the first electrodes and second electrodes, and either one of the electrodes is covered with the insulating material in an area exclusive of at least the pixel area, so that it is preferable, in view of completely suppressing the crosstalk especially for the case where a part of at least the second electrodes thereof is covered with the insulating material, that either one of the relations below:

$$L \geq G \text{ and } L \geq G-t$$

is satisfied, where L represents the distance between the effective electrode planes of the adjacent first electrodes, t represents the thickness of the insulating material on the second electrode side, and G represents the distance between the second electrode surface and the effective electrode plane of the first electrode. Too large L, however, excessively widens the distance between the adjacent pixels to thereby lowers the pixel density, so that it is preferable to satisfy $L \leq 3G$, and more preferably $L \leq 2.5G$.

In the display element in which the colorant material capable of causing deposition, dissolution or color change based on electrochemical reduction or oxidation and the polymer solid electrolyte are disposed between the first electrodes and second electrodes, and either one of the electrodes is covered with the insulating material in an area exclusive of at least the pixel area, so that it is necessary, in view of completely suppressing the crosstalk especially for the case where a part of at least the second electrodes thereof is covered with the insulating material, that the relation below:

$$l-a=L+b \text{ or } l=L+a+b$$

is satisfied, where b represents the effective electrode width of the first electrode, l represents the distance between the outer ends of the insulating material located around the pixels on the second electrode, t represents the thickness of the insulating material, and G represents the distance between the second electrode surface and the effective electrode plane of the first electrode, because adoption of the matrix arrangement requires that the first and second electrodes have the same pitch.

While the relation of L≧2G should hold assuming now that the distance between the effective electrode planes of the adjacent first electrodes as L, and the distance between the second electrode surface and the effective electrode plane of the first electrode as G, too large L excessively widens the distance between the adjacent pixels to thereby lowers the pixel density, so that it is preferable to satisfy L≦=3G, and more preferably L≦2.5G.

The insulating material preferably comprises silicon oxide such as $SiO_2$, or a resin.

In view of forming the matrix-patterned electrodes, it is preferable that the first and second electrodes are respectively formed on the predetermined substrates at regular intervals, and that the first and second electrodes are opposed while placing the electrolyte in between.

In this case, it is preferable in view of improving the sharpness of the display that the first and second electrodes are covered with the insulating material in the area exclusive of at least the intersectional portions thereof when viewed from the direction normal to the electrode plane.

In order to secure the pixel area, the first and second electrodes are preferably formed with a stripe pattern, and these stripe-patterned electrodes are preferably same or different in the size of area having no insulating material formed therein.

In order to secure the pixel area, the first electrodes are preferably formed as pixel electrodes periodically arranged on a predetermined substrate, and the second electrodes are preferably covered with the insulating material in an area exclusive of portions corresponded to the pixels.

In order to effectively secure the pixel area in this case, the area of the second electrodes not covered with the insulating material is larger than the effective electrode area of the first electrodes which serve as the pixels.

For the case where the colorant material capable of causing deposition, dissolution or color change based on electrochemical reduction or oxidation and a polymer solid electrolyte disposed between the first electrodes and second electrodes, and at least either one of the electrodes is covered with a continuous layer of the colorant material, it is preferable in view of improving the sharpness of the display that at least either one of the electrodes is covered with the insulating material so as to allow the colorant material layer to contact with the electrolyte in an area exclusive of the pixel area.

In view of forming the matrix-patterned electrodes in this case, it is preferable that the portions of the colorant material layer not covered with the insulating material are formed at predetermined intervals, and disposed so as to cross the opposing electrodes formed at predetermined intervals.

To raise the coloring density and contrast, the colorant material is preferably a metal ion or an electrochromic material.

The metal ion is preferably at least one cation selected from the group consisting of silver, bismuth, chromium, iron, nickel, cadmium and the like.

In this case, the electrochromic material may be formed as a continuous layer over the surface of at least either one of the first and second electrodes.

The electrochromic material is preferably at least either one compound selected from the group consisting of tungsten oxide, spinel compound, viologen compound, electroactive polymer material and so forth.

The electro-active polymer material preferably comprises at least one compound selected from the group consisting of polypyrrole, polyazulene, polythiophene, polyaniline, and so forth.

It is also preferable to configure the display element so that display patterns are formed on the second electrode side.

In this case, it is preferable, in view of realizing active matrix driving, that the first electrodes are connected to drive transistors formed on the same substrate.

Preferred embodiments of the present invention will be described in the next paragraphs referring to the attached drawings.

A display element 18 shown in FIG. 1A is such as having insulating films 14a, 14b formed at predetermined positions respectively on transparent pixel electrodes 2 and opposing electrodes 6.

On a transparent support 1 such as a glass substrate, the transparent pixel electrodes 2 which comprises an ITO film are formed for every pixel portion 17. The transparent pixel electrodes (ITO film) 2 are formed by physical film formation such as vapor deposition and sputtering, and succeeding photo-etching. The individual pixel portions 17 are arranged so as to have a dot pattern (or matrix pattern) on the transparent support 1.

Available materials for composing the transparent support 1 include transparent glass substrates such as quartz glass plate and white sheet glass but not limited thereto, and they are also exemplified by esters such as polyethylene naphthalate and polyethylene terephthalate; polyamide; polycarbonate; cellulose esters such as cellulose acetate; fluorine-containing polymers such as poly(vinylidene fluoride), poly(tetrafluoroethylene) and hexafluoropropylene; polyethers such as polyoxymethylene; polyacetal; polyolefins such as polystyrene, polyethylene, polypropylene and methylpentene polymer; and polyimides such as polyimide-amide and polyether imide.

While the transparent support 1 composed of these synthetic resins may be configured as a rigid substrate which cannot readily be bent, it may be configured as a flexible film. As a material for composing the transparent pixel electrodes 2, it is preferable to use a sputtered or vapor-deposited film of ITO which is a mixture of $In_2O_3$ and $SnO_2$, as well as $SnO_2$, $In_2O_3$, MgO, ZnO or the like. It is also preferable to use these films further doped with Sn or Sb.

As for the transparent pixel electrodes 2, the width, thickness and distance between the adjacent transparent pixel electrodes 2 may arbitrarily be selected so far as desired effects can be expected.

Next, on the dot-patterned (or stripe-patterned) transparent pixel electrodes (e.g., ITO film) 2, an insulating film 14b ($SiO_2$) of 200 nm thick having a predetermined pattern is formed typically by the plasma CVD process using TEOS ($Si(OC_2H_5)_4$: tetraethoxy orthosilicate) and $O_2$, and succeeding patterning.

As for the insulating film 14b, the width, thickness and distance between the adjacent transparent pixel electrodes 2 may arbitrarily be selected so far as desired effects can be expected.

Next, on the transparent support 1 having the insulating film 14b already formed thereon, a polymer solution containing an electrolyte is coated to a predetermined thickness, a support 7 having opposing electrodes 6 and the insulating film 14a formed thereon is placed, and the stack is allowed to dry to thereby form a polymer solid electrolyte layer 5.

Polymer molecules which serve as the polymer electrolyte are used after being previously dissolved in an appropriate non-aqueous solvent (organic solvents, etc.). The organic solvents applicable herein are of no special sort, and any publicly-known, general-purpose solvents for use in batteries are available.

The general-purpose solvents for batteries are preferably aprotic non-aqueous solvents, where examples of which include ethylene carbonate, propylene carbonate, butylene carbonate, dimethyl carobnate, diethyl carbonate, ethyl methyl carbonate, methyl acetate, ethyl acetate, ethyl propionate, dimethylsulfoxide, γ-butyrolactone, dimethoxyethane, diethoxyethane, tetrahydrofuran, formamide, dimethylformamide, diethylformamide, dimethylacetamide, acetonitrile, propionitrile and methylpyrrolidone.

Selection of a highly-volatile solvent is advantageous for fabrication of the display element, because this type of solvent can be removed by evacuation or heating under manufacturing conditions for the display element. It is also allowable to fabricate the display element while leaving a part of the solvent unremoved therein.

The polymer for composing the polymer electrolyte may be at least any one selected from the group consisting of polyalkylene oxide such as polyethylene oxide, polyalkylene imine such as polyethylene imine, and polyalkylene sulfide such as polyethylene sulfide, respectively having skeletal units of $-[(CH_2)_mO-]_n-$, $-[(CH_2)_mN]_n-$ and $-[(CH_2)_mS-]_n-$; branched polymers having these polymers as their principal chains; polymers such as polyacrylate, polymethyl methacrylate, poly(vinylidene fluoride), polycarbonate, polyacrylonitrile and polyvinyl alcohol; and mixtures thereof.

The metal ion (electrolyte) to be dissolved into the aforementioned general-purpose solvents for batteries, and used as the colorant material capable of coloring or decoloring based on electro-chemical deposition and dissolution are not specifically limited, and available examples thereof include ions of various metals such as bismuth, copper, silver, lithium, iron, chromium, nickel and cadmium; or ions of combination of these metals. Particularly preferable metal ions are bismuth ion and silver ion. Bismuth and silver are preferable because they can readily proceed the reversible reaction (repetitive coloring and decoloring), ensure a large degree of color change during the deposition, and have a desirable memory effect (keeping of displayed colors) after the electro-chemical deposition.

The colorant material is preferably at least any one silver salt selected from the group consisting of silver nitrate, silver borofluoride, silver halide (AgI, etc.), silver perchlorate, silver cyanate and silver thiocyanate.

Besides these silver salts, it is preferable to dissolve at least one support electrolyte selected from the group consisting of quaternary ammonium halides (halogen is F, Cl, Br, I, etc.), alkalimetal halides (LiCl, LiBr, LiI, NaCl, NaBr, NaI, etc.), alkali metal cyanates and alkali metal thiocyanates (alkali metal is Na, Li, K, etc., for both cases).

Examples of other available support electrolytes include lithium salts such as $LiBF_4$, $LiClO_4$, $LiPF_6$, $LiCF_3SO_3$, etc.; potassium salts such as KCl, KI, KBr, etc.; and tetraalkylammonium salts such as tetraethylammonium borofluoride, tetraethylammonium perchlorate, tetrabutylammonium borofluoride, tetrabutylammonium perchlorate, tetrabutylammonium halide, etc. Length of the alkyl chains of these tetraalkylammonium salts may be identical or may be different from each other.

The polymer solid electrolyte layer 5 is preferably formed by adding a predetermined amount of plasticizer in order to improve workability of the polymer compounds. The plasticizer may be at least any one compound selected from the group consisting of water, ethanol, isopropanol and mixtures thereof for the case where hydrophilic polymers are used; and from the group consisting of ethylene carbonate, propylene carbonate, butylene carbonate, dimethyl carbonate, diethyl carbonate, ethyl methyl carbonate, γ-butyrolactone, acetonitrile, propionitrile, sulfolane, dimethoxyethane, diethoxyethane, tetrahydrofuran, methyl acetate, ethyl acetate, ethyl propionate, formamide, dimethylformamide, diethylformamide, dimethylsulfoxide, dimethylacetamide, n-methylpyrrolidone or the like (particularly aprotic solvent), and mixtures thereof for the case where the hydrophobic polymers are used.

The polymer solid electrolyte layer 5 is added with a colorant in order to improve the contrast. As described in the above, for the case where the metal ion develops black color, a white material having a large masking effect is added so as to produce the background color. Examples of the material include white cloth, white paper and white particles for coloring, and the white particles for coloring may be at least any one selected from the group consisting of titanium dioxide, calcium carbonate, silicon dioxide (silica), magnesium oxide and aluminum oxide. It is also allowable to use dye for coloring.

For the case where the colorant is an inorganic particle, ratio of mixing of the colorant preferably falls within a range from 1 to 20 wt % or around, more preferably from 1 to 10 wt % or around, and still more preferably from 5 to 10 wt % or around.

The above-described ranges were defined because the inorganic white particles such as titanium dioxide cannot dissolve into the polymer material but can only be dispersed therein, so that too large ratio of mixing thereof will cause coagulation of the inorganic particles, and will make the optical density non-uniform. The inorganic particles are also disadvantageous in having no ion conductivity, and increase in the ratio of mixing thereof will result in a lowered conductivity of the polymer electrolyte. Taking both causes into consideration, the upper limit of the ratio of mixing is preferably set to 20 wt % or around.

For the case where dye is used for the colorant, the ratio of mixing thereof may be as much as 10 wt %.

This is because the dye has a far higher coloring efficiency as compared with the inorganic particles. Any electro-chemically stable dyes can, therefore, achieve sufficient contrast even in a small amount of use. In general, the dye is preferably an oil-soluble dye.

For the case where the inorganic particle is mixed as the colorant, the polymer solid electrolyte layer 5 preferably has a thickness of 20 μm to 200 μm, more preferably 50 μm to 150 μm, and still more preferably 70 μm to 150 μm.

This is because smaller thickness of the polymer solid electrolyte layer 5 desirably results in smaller resistivity between the electrodes, shorter time for the coloring and decoloring, and smaller power consumption. A thickness of less than 20 μm, however, tends to generate pinholes or cracks due to lowered mechanical strength, and an excessively thin layer will result in only an insufficient whiteness (contrast) due to a less amount of mixing of the white particles.

In parallel to the preparation of the polymer solution for forming the polymer solid electrolyte layer 5, the opposing electrodes 6 which comprise a desired thickness of palladium film or the like is formed on the support 7 by the physical film formation process such as sputtering.

The opposing electrodes 6 may be composed of any electro-chemically stable metal, preferably of platinum, chromium, aluminum, cobalt, palladium or the like, and can preferably formed as a good conductor by the sputtering process or vapor deposition process.

The width, thickness and distance between the adjacent electrodes of the opposing electrodes 6 can arbitrarily be selected so far as predetermined effects can be attained.

It is also allowable to use carbon for composing the opposing electrodes 6 if the metal used for the main reaction can preliminarily or occasionally be supplemented to a sufficient degree. Carbon used for this purpose can be immobilized on the metal electrodes, and a specific method therefor is such as printing a carbon paint, which is prepared as an ink using a resin, on the surface of the substrate. Use of carbon is successful in reducing costs of the opposing electrodes 6.

The support 7 may be omissible for the case where the opposing electrodes 6 have a sufficient rigidity. It is not always necessary for materials for composing the support 7 to be transparent, and any substrates or films capable of surely holding the opposing electrodes 6 and polymer solid electrolyte layer 5 are available.

Examples of the materials include glass substrates such as quartz glass plate and white sheet glass, ceramic substrates, paper substrates and wood substrates, but not limited thereto; and synthetic resin substrates are also available, where examples of which include esters such as polyethylene naphthalate and polyethylene terephthalate; polyamide; polycarbonate; cellulose esters such as cellulose acetate; fluorine-containing polymers such as poly(vinylidene fluoride), poly(tetrafluoroethylene) co-hexafluoropropylene; polyethers such as polyoxymethylene; polyacetal; polyolefins such as polystyrene, polyethylene, polypropylene and methylpentene polymer; and polyimides such as polyimideamide and polyether imide.

At a predetermined position on the dot-patterned (or stripe-patterned) opposing electrodes 6, the insulating film 14a ($SiO_2$) of 200 nm thick having a predetermined pattern was formed by the plasma CVD process using TEOS ($Si(OC_2H_5)_4$: tetraethoxy orthosilicate) and $O_2$, and succeeding patterning. Next, the support 7 is placed on the polymer solution coated on the transparent support 1, to thereby allow the support 7 and transparent support 1 to hold the polymer solution of polymer electrolyte in between so as to contact with both electrodes 6 and 2.

In this case, it is necessary to secure a predetermined distance (gap) between the individual electrodes holding the polymer solution of the polymer electrolyte in between. In order to attain a necessary strength of the element, a rod-formed reinforcing member, for example, having an arbitrary diameter or length may preliminarily be mixed in the polymer solution (or placed on the support 1) so as to make it serve as a spacer.

It is also allowable to ensure the gap between the electrodes by placing the spacer which comprises non-woven fabric or paper in between, and by immersing the polymer solution of the polymer electrolyte into the spacer which comprises non-woven fabric or paper to thereby ensure an optimum distance between the electrodes.

Next, the support 7 is stacked on the transparent support 1 so that the opposing electrodes 6 are brought into contact with the polymer solution, to thereby obtain a status in which the polymer solution is held between both substrates 7 and 1.

The polymer solution is then subjected to heating and drying so as to allow the solvent to vaporize and to allow itself to be cured, to thereby form the polymer solid electrolyte layer 5 between the support 7 and the transparent support 1.

It is also allowable herein to use a crosslinking agent so as to form chemical bonds among the polymer molecules (or linear polymer compounds) to thereby obtain a polymer compound having a three-dimensional network structure. One possible way of using the crosslinking agent is such that the agent is preliminarily mixed into the component monomer molecules so that crosslinking reaction can proceed in parallel with the polymerization reaction.

Examples of the crosslinking agent include divinyl benzene, 1,5-hexadien-3-yne, hexatriene, divinyl compounds such as divinyl ether and divinyl sulfone, diallyl compounds such as diallyl phthalate, 2,6-diacrylphenol and diacryl carbinol.

The crosslinking agent may be such as those causative of crosslinking based on ionic mechanism, condensation reaction or addition reaction. Those based on condensation reaction include aldehyde, dialdehyde, urea derivatives, glycol, dicarboxylic acid, mono- and diamine, and those based on addition reaction include diisocyanate, bis(epoxy) compound and bis(ethyleneimine) compound.

Preferable embodiments of the present invention will be described in the next.

EXAMPLE 1

Figure 1B:
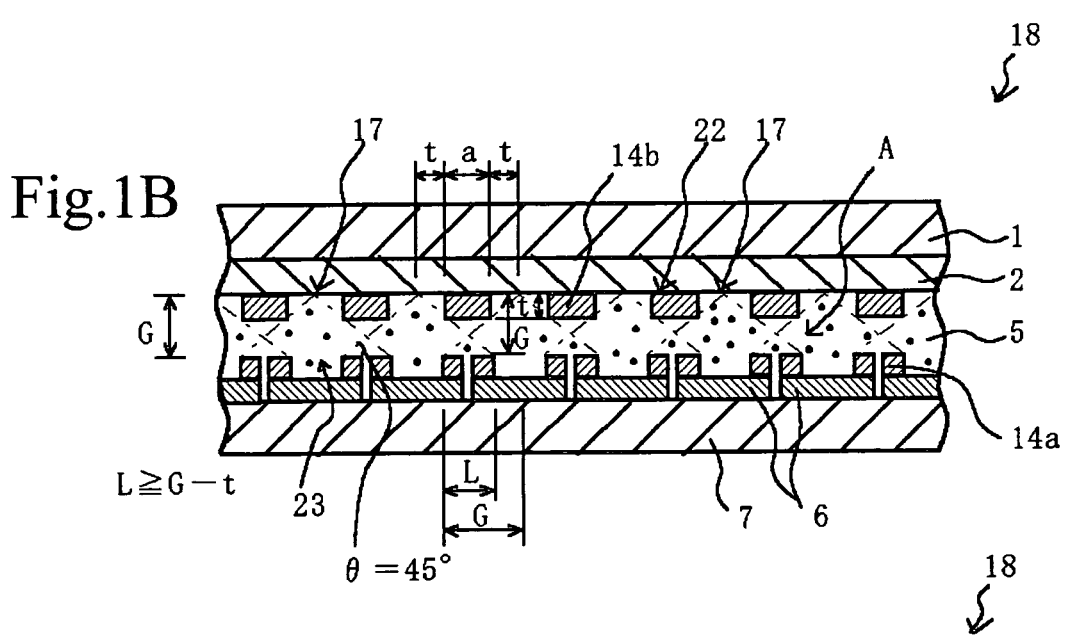
Figure 1C:
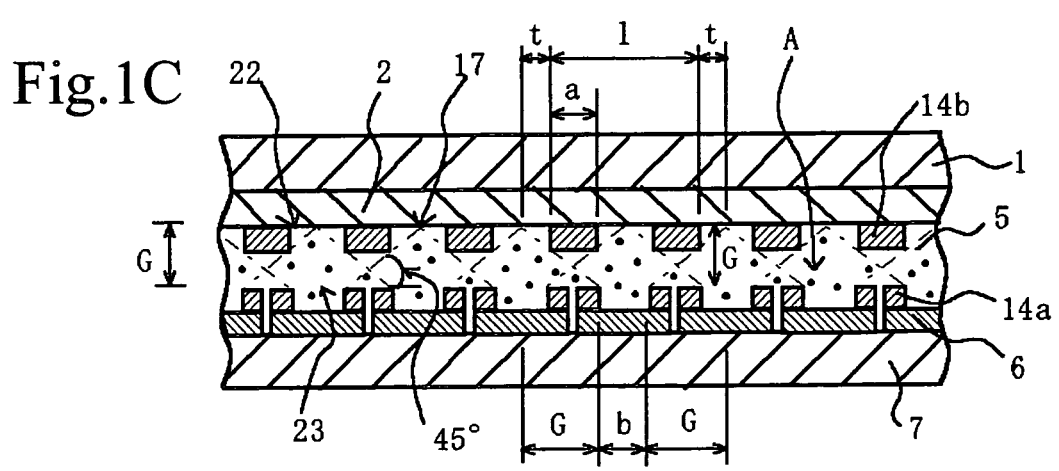

In the display element 18 of this example, as shown in FIGS. 1A to 1C, the insulating films 14b and 14a composed of $SiO_2$ are disposed at the predetermined positions on both of the transparent pixel electrodes 2 and the opposing electrodes 6.

In the display element 18, the portions of the transparent pixel electrodes 2 covered with the insulating film 14b are not causative of colored display because donation and acceptance of electrons between the metal ions, which are the electrolyte, and the transparent pixel electrodes are prohibited in that portions, and so that electro-chemical deposition of the metal ions contained in the polymer solid electrolyte layer will never occur (the same will apply for the description below). The ion diffusion range A is thus restricted substantially within an area inside the insulating film 14b, and this allows the metal to deposit (or allows the coloring) only within the pixel portions 17.

Pattern of the insulating film 14b is designed to have a two-dimensional periodical arrangement so that the opening portions (pixel portions 17) fall within portions where the transparent pixel electrodes 2 and opposing electrodes 6 overlap. It is not always necessary for the portions where the electrodes overlap to have the size of area or shape same with those of the pixel portions 17, where it is a general practice to design the latter a little larger. The width of the electrodes per se is preferably designed larger than that of the opening portions of the insulating film so as to reduce the electric resistance.

Figure 4A:
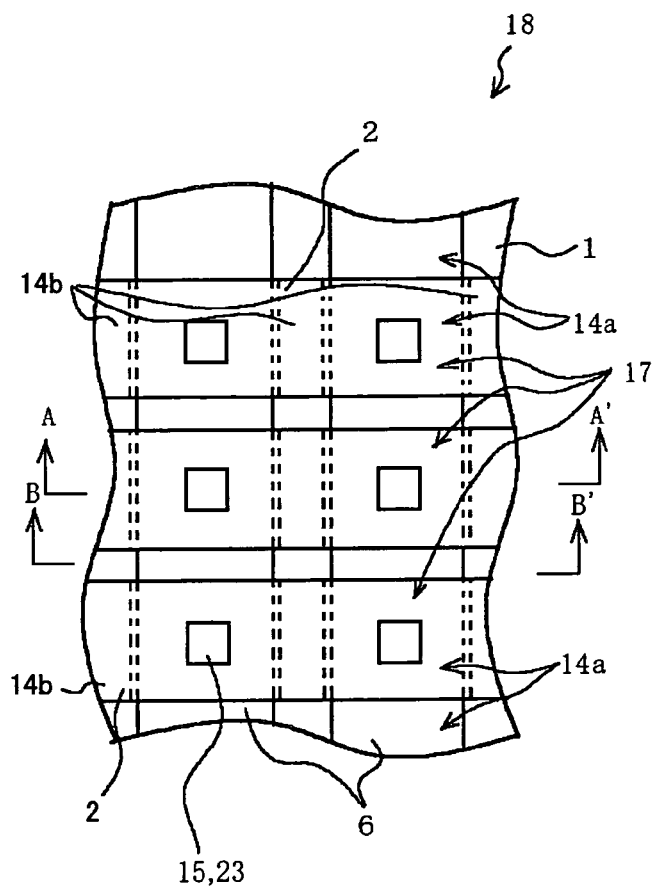
FIGS. 4A to 4C are a plan view and sectional views of the display element of the embodiment previously shown in FIG. 1A.
Figure 4B:
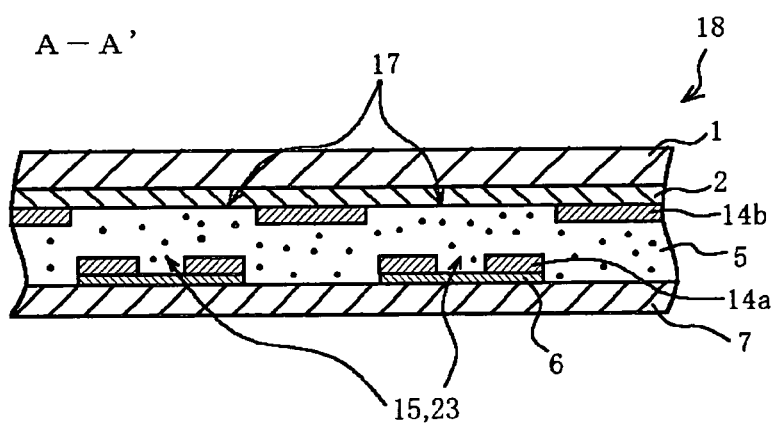
Figure 4C:
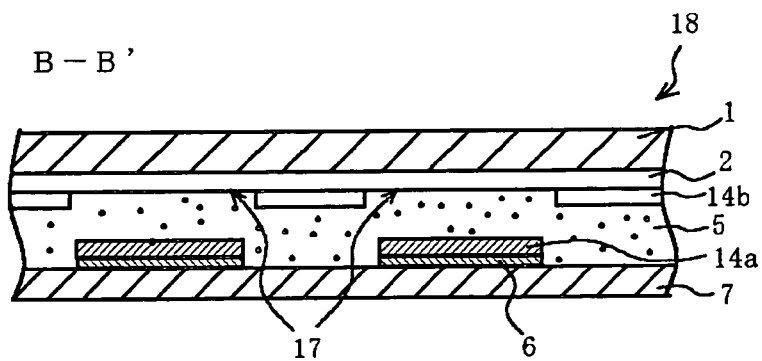
Figure 5A:
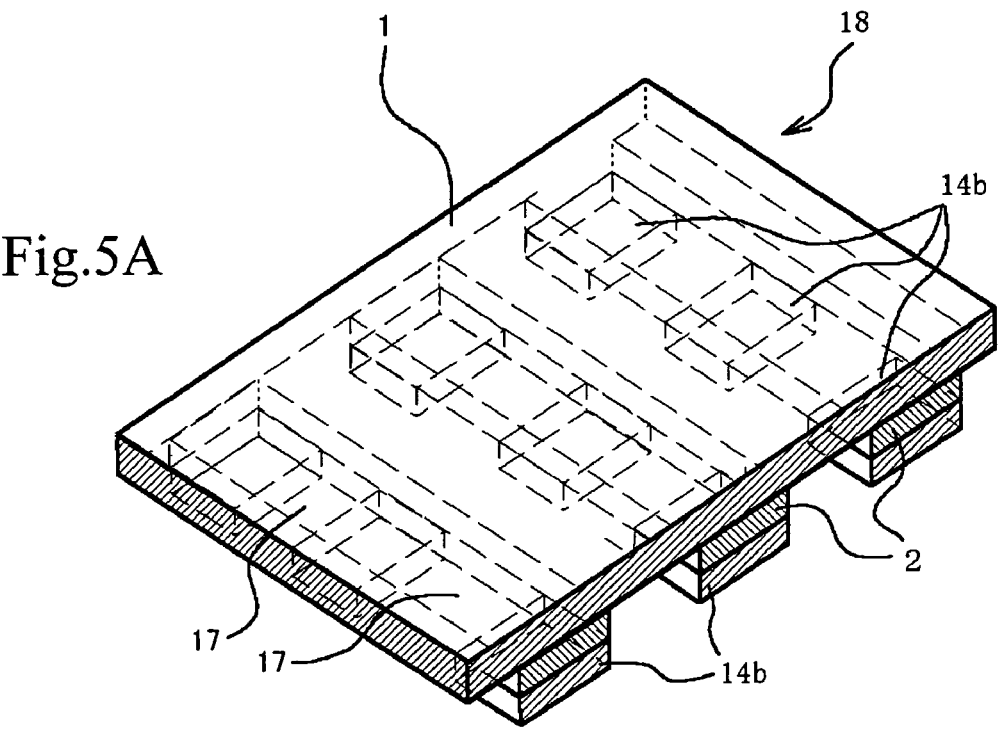
FIGS. 5A and 5B are exploded perspective views of the same display element.
Figure 5B:
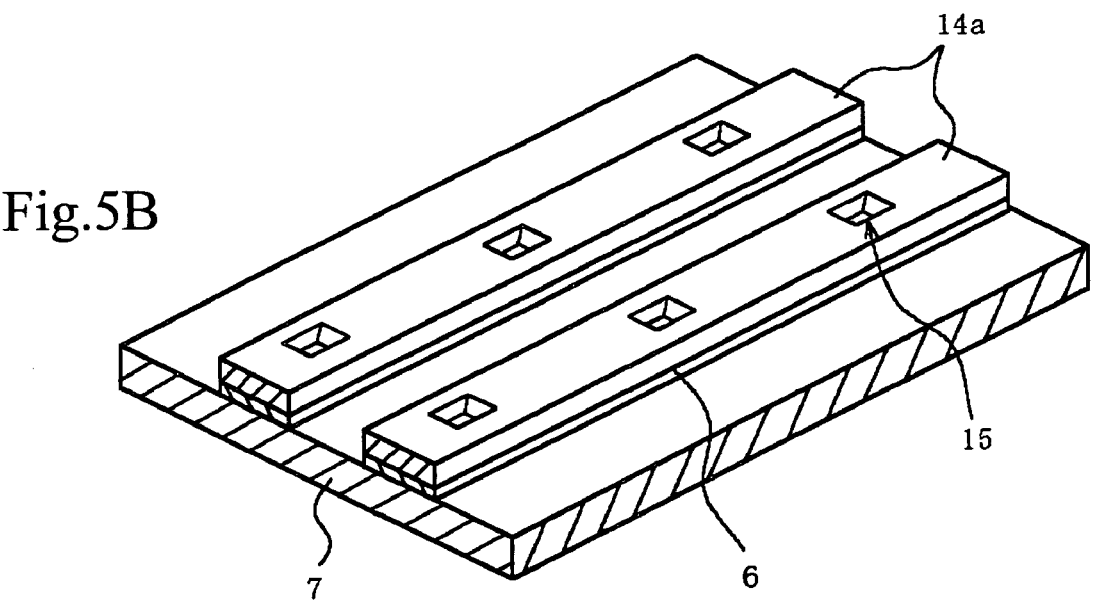

A purpose of placing the insulating film 14b on the transparent pixel electrodes 2 is to avoid the coloring in the area other than the opening portions (pixel portions 17), and to prevent crosstalk between the adjacent pixel portions 17 and blurring of colors. On the other hand, a purpose of placing the insulating film 14a also on the opposing electrodes 6 is to make the opposing electrodes 6 wider in the width to thereby reduce the electric resistance (securing of electric conductivity), as clearly shown in FIGS. 4A to 4C, and to restrict the ion diffusion range A.

Next, the distance between the electrode surface 22 of the transparent pixel electrodes 2 and the effective electrode plane 23 of the opposing electrodes 6 (where, the effective electrode plane is defined by the upper end surface of the opening portions, which allow ion diffusion, of the insulating film 14a for the case where the opposing electrodes 6 have the insulating film 14a formed thereon) is defined as G, the distance between the effective electrode planes of the adjacent opposing electrodes 6 is defined as L, the distance between the outer ends of the insulating material 14b located around the pixel portions 17 of the transparent pixel electrodes 2 is defined as l, the thickness of the insulating film 14b on the electrode surfaces of the transparent pixel electrodes 2 is defined as t, the width (length) of the insulating film 14b on the electrode surfaces of the transparent pixel electrodes 2 is defined as a, and the width of the effective electrode plane 23 of the opposing electrodes 6 is defined as b (the same will apply also in other embodiments described below).

While a value of the length a of the insulating film 14b formed on the transparent pixel electrodes 2 infinitely to as close as 0 is preferable in view of securing the pixel area, the length can be determined depending on the number of pixels of the display element.

The thickness t of the insulating film 14b on the transparent pixel electrodes 2 may not be uniform, unlike that illustrated in FIGS. 1A to 1C, because the insulating film 14b is practically formed through fine formation processes, and the insulating film 14b may thus have variable angle portions or sectional forms. It is thus defined that the individual formulae concerning the thickness t described in later are substantially those on the design basis, and that they give only approximations in the practical consideration.

The ions which diffuse between the effective electrode planes of the opposing electrodes 6 and the electrode surface of the transparent pixel electrodes 2 towards the transparent pixel electrode 2 side can move (migrate) by diffusion towards the pixel portions 17 of the transparent pixel electrodes 2 approximately within an angular range of 45°. Although the actual ion diffusion range may occasionally exceed 45°, the ion diffusion range can be defined herein almost within a range of 45°, because the excessive case is extremely rare (the same will apply also in other embodiments described below).

For the case where the insulating films 14b and 14a are formed on the transparent pixel electrodes 2 and opposing electrodes 6, respectively, the opposing electrodes 6 are typically arranged, as shown in FIG. 1A, so as to avoid overlapping (crosstalk) of the ion diffusion ranges A on the adjacent opposing electrodes 6, to thereby prevent the crosstalk due to overlapping of the ion diffusion ranges from occurring.

In this display element 18, the ions diffuse and deposit (cause coloring) over the entire area of the pixel portions 17 partitioned by the insulating film 14b formed on the transparent pixel electrodes 2 without causing waste, and this brings the pixel portions 17 into an ideal status which is excellent in the display efficiency.

In the next exemplary case shown in FIG. 1B where the insulating films 14b, 14a are formed on the transparent pixel electrodes 2 and opposing electrodes 6, respectively, and the opposing electrodes 6 are arranged too closely with each other, the ion diffusion ranges on the adjacent opposing electrodes 6 will partially invade from one to another if the distance L between the effective electrode planes of the adjacent opposing electrodes 6 follows the relation of $L<G-t$. It is no more possible for the insulating film 14b on the transparent pixel electrode 2 side to prevent the invasion, and this results in the crosstalk or color blurring (or color mixing) (simply referred to as "crosstalk, etc.", hereinafter).

To avoid these nonconformities, the relation of $L \geq G-t$ should hold. It is also theoretically supported that the insulating film 14b can successfully prevent the ion diffusion from one to another if the relation of $L \geq G-t$ holds.

On the other hand, in the matrix arrangement shown in FIG. 1C, which is similar to that shown in FIG. 1B, the transparent pixel electrodes 2 and the opposing electrodes 6 should have the same pitch, and thus the relation below:

$$1-a=L+b, \text{ or } l=L+a+b$$

should hold.

To avoid the aforementioned crosstalk, etc., a range of the distance l between the outer ends of the insulating material 14b located around the pixel portions 17 on the transparent pixel electrodes 2 preferably satisfies the relation below:

$$l \geq 2G+b-2t.$$

If $l<2G+b-2t$, the outer ends of the insulating film 14b on the transparent pixel electrodes 2 come too close with each other, this again makes the insulating film 14b unsuccessful in preventing the ion diffusion from extending towards the adjacent pixel portion, and this results in the crosstalk, etc.

It is all enough for the display element 18 to satisfy either of the conditions of $L \geq G-t$ or $l=L+a+b$, but concomitant satisfaction of these two conditions is furthermore successful in completely preventing the crosstalk or color blurring (or color mixing), and in ensuring the pixel portions and pixel density.

In addition, selective coloring and decoloring occur on the transparent pixel electrodes 2 based on electro-chemical reduction and oxidation of the colorant materials which comprises metal ions, and the process is promoted by the polymer electrolyte, so that this is successful in realizing a reflection-type display element which has a large contrast and coloring density, and is free from problems typically in color fading by virtue of the memory effect of the deposited matters during a long-term use (the same will apply hereinafter). This is irrespective of the simple matrix drive system and active matrix drive system.

FIGS. 4A to 4C, and FIGS. 5A and 5B show a specific configuration of the display element according to this embodiment. The insulating films 14b, 14a are formed on both of the transparent pixel electrodes 2 and opposing electrodes 6, respectively, and either one of, or both of the conditions $L \geq G-t$ and $l \geq 2G+b-2t$ are satisfied so as to prevent crosstalk, etc. and to secure pixel portions.

In addition, the configuration of the display element 18 in which the individual electrodes are arranged to form the matrix pattern as shown in FIGS. 1A to 1C, and the security of a sufficient width of the stripe-formed opposing electrodes 6 are successful in reducing electric resistance of the opposing electrodes 6 as wirings, and in ensuring a desirable conductivity even if the effective electrode plane 15 opposing with the pixel portion is narrowed by the insulating film 14a.

It is also possible to further effectively prevent the crosstalk, etc. by narrowing the area of the effective electrode plane 15 of the opposing electrodes 6 at the center of the pixel portions 17.

Figure 6:
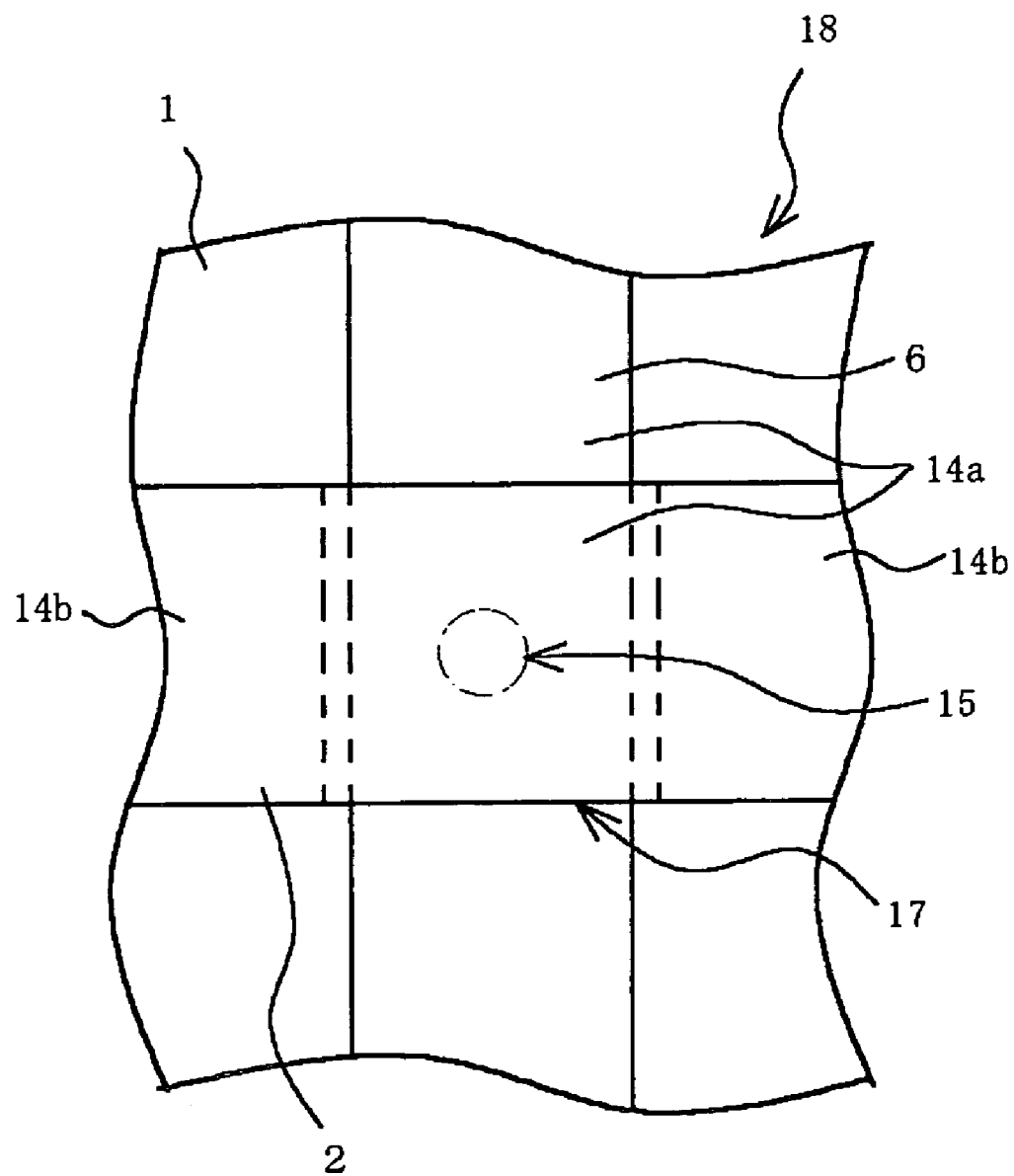
FIG. 6 is a partial plan view of another display element.

As shown in FIG. 6, the effective electrode plane 15 (upper end plane of the opening of the insulating film 14a) more preferably has a circular or other curved contour rather than a square contour if possible. This is because the circular contour having no angled portions will never cause concentration of the electric field and is more likely to generate isoelectric plane. Any angled portions tend to cause incomplete erasure of the display, whereas the curved portions will never cause it.

EXAMPLE 2

Figure 2A:
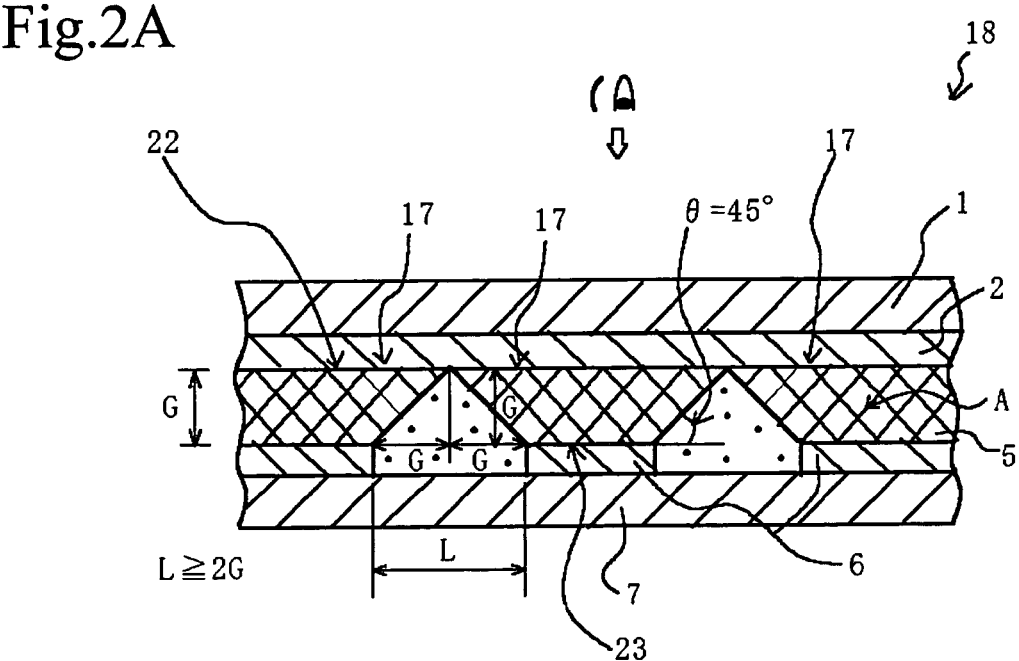
FIGS. 2A and 2B are sectional views of display elements of another embodiment of the present invention.

This embodiment represents the case where the insulating film 14b is not provided at all on the transparent pixel electrode 2, as shown in FIG. 2A, and instead the distance L between the effective electrode planes of the adjacent opposing electrodes 6 is widened enough so that the individual ion diffusion ranges on the adjacent opposing electrodes 6 do not overlap with each other to thereby suppress the crosstalk, etc.

That is, in order to avoid the overlapping of the ion diffusion ranges on the adjacent opposing electrodes 6 to thereby suppress the crosstalk, etc., the range of the distance L between the effective electrode planes of the adjacent opposing electrodes 6 is defined so as to satisfy the relation of:

$$L \geq 2G.$$

If the relation of L<2G should hold, the adjacent opposing electrodes 6 are too close with each other, and this causes the overlapping of the ion diffusion ranges and results in the crosstalk, etc.

Figure 2B:
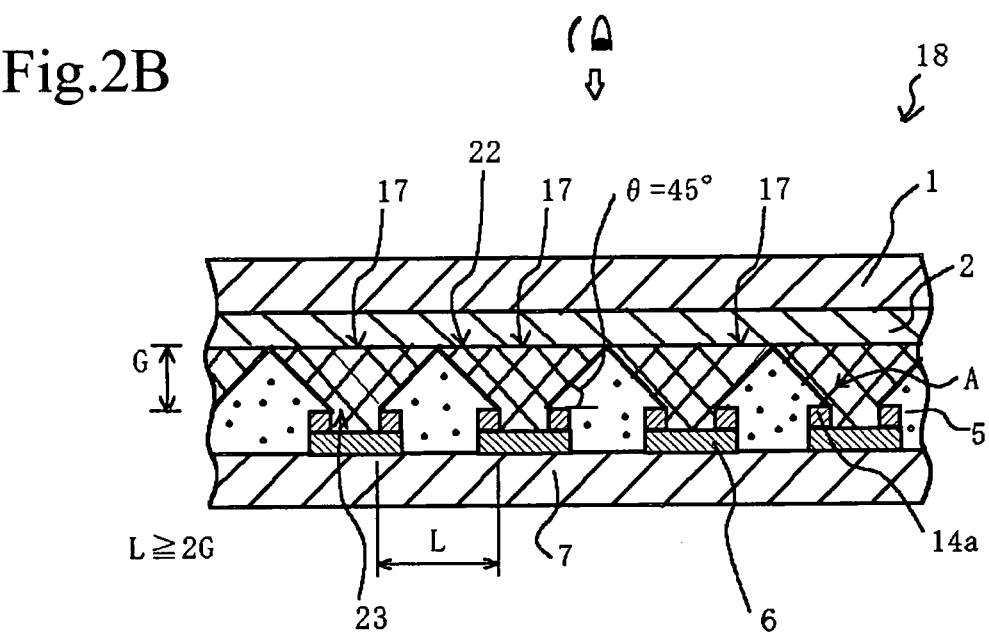

In the next case where only the insulating film 14a is provided on the opposing electrodes 6 side, while leaving the transparent pixel electrodes 2 not provided with the insulating film 14b as shown in FIG. 2B, the distance L between the effective electrode planes of the adjacent opposing electrodes 6 is defined so as to again satisfy the relation of:

$$L \geq 2G.$$

If the relation of L<2G should hold, the adjacent opposing electrodes 6 are too close with each other, and this causes the overlapping of the ion diffusion ranges and results in the crosstalk, etc.

Consequently in both cases shown in FIGS. 2A and 2B, satisfying the condition of L≧2G is desirable enough to prevent the crosstalk, etc., and to secure necessary pixel portions and pixel density.

EXAMPLE 3

Figure 3A:
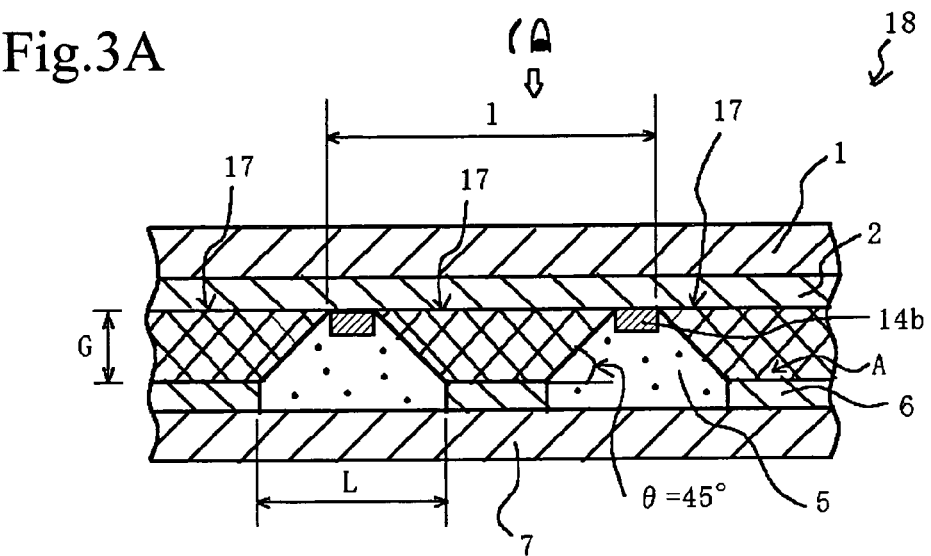
FIGS. 3A to 3C are sectional views of display elements of still another embodiment of the present invention.

In the next case where only the insulating film 14b is provided on the transparent pixel electrodes 2 side as shown in FIG. 3A, the opposing electrodes 6 in this display element 18 are arranged so that the ions can reach the entire area of the pixel portions 17 partitioned by the insulating film 14b formed on the transparent pixel electrodes 2 without causing waste, and this brings the pixel portions 17 into a status excellent in the display efficiency.

That is, for the case where the adjacent opposing electrodes 6 come close to with each other, the distance L between the effective electrode planes of the adjacent opposing electrodes 6 should satisfy the relation of:

$$L \geq G.$$

Figure 7A:
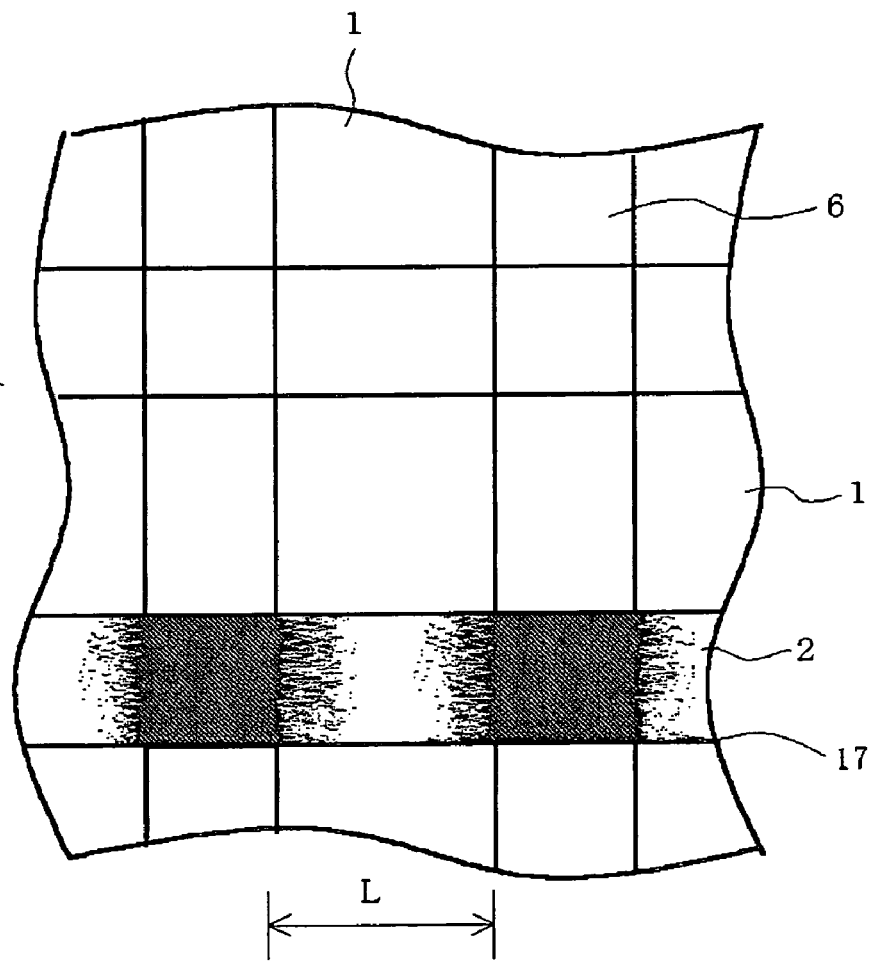
FIGS. 7A and 7B are a plan view and a sectional view of the display element of the embodiment previously shown in FIG. 2A.
Figure 7B:
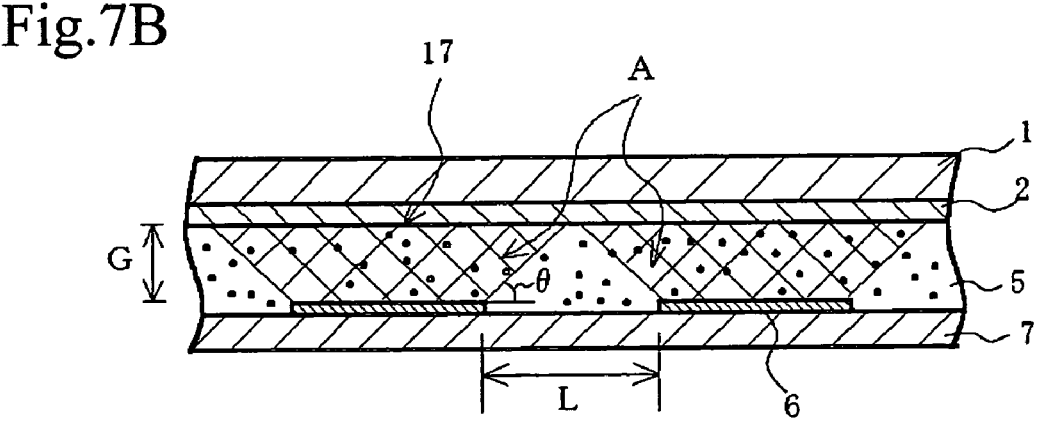

This is successful in avoiding the crosstalk between the adjacent pixels as shown in FIGS. 7A and 7B, and also avoiding color blurring or mixing.

If the relation of L<G should hold, the adjacent opposing electrodes 6 are too close with each other, so that it is no more possible for the insulating film 14b on the transparent pixel electrodes 2 side to prevent the ion diffusion from one pixel to the other pixels, and this results in the crosstalk, etc.

Figure 3B:
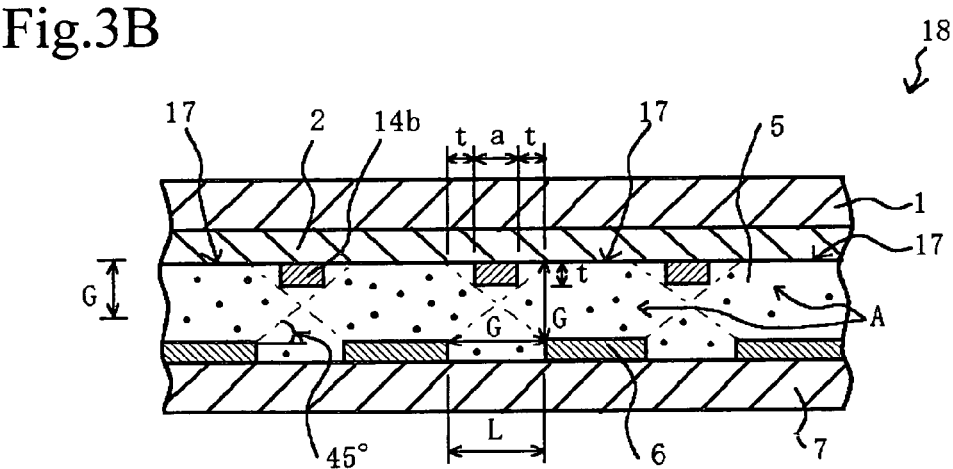

In the next case shown in FIG. 3C, which is similar to as shown in FIG. 3B, the range of the distance l between the outer ends of the insulating material 14b located around the pixel portions 17 of the transparent pixel electrodes 2 should satisfy the relation below:

$$l = L + a + b$$

based on the same reason as described in the above, and more preferably satisfy the relation below:

$$l \geq 2G + b - 2t.$$

If the relation of l<2G+b−2t should hold, it is again no more possible for the insulating film 14b on the transparent pixel electrodes 6 side to prevent the ion diffusion from one pixel to the other pixels, and this results in the crosstalk, etc.

It is all enough to satisfy either of the conditions of L≧G and l=L+a+b, but concomitant satisfaction of these two conditions is further more successful in completely preventing the crosstalk, etc., and in securing necessary pixel area and pixel density.

EXAMPLE 4

Figure 3C:
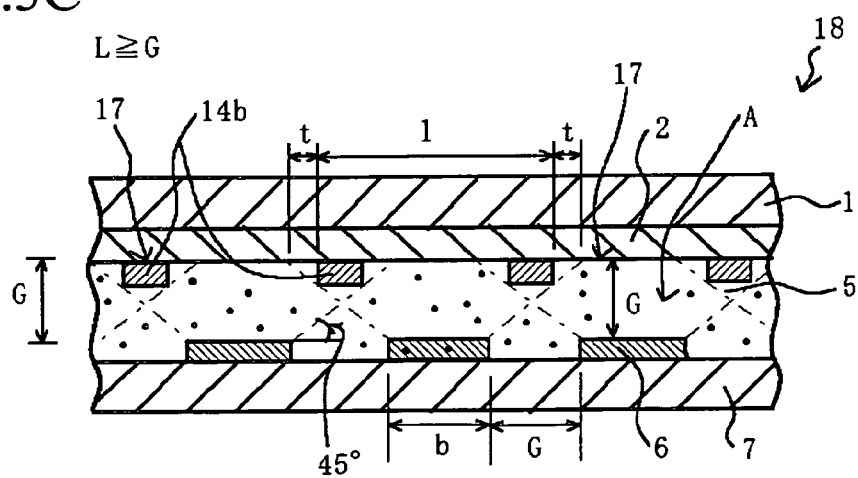
Figure 8A:
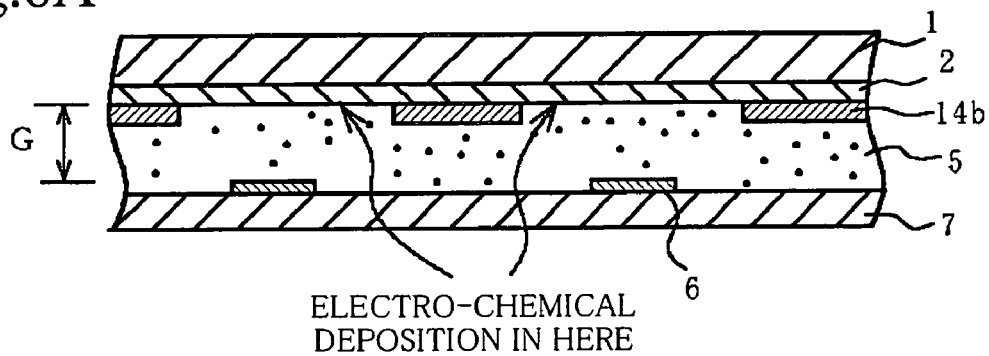
FIGS. 8A to 8C are sectional views of display elements of another embodiment of the present invention.

Next example of the display element 18 shown in FIG. 8A is almost similar to those of Example 3 shown in FIGS. 3A to 3C, and is configured so as to contain the metal ion as the colorant material in the polymer solid electrolyte layer 5 (ion conductor), and so as to cause colored display by electrochemical deposition of the metal ion when driven for example by the simple matrix system.

Figure 8B:
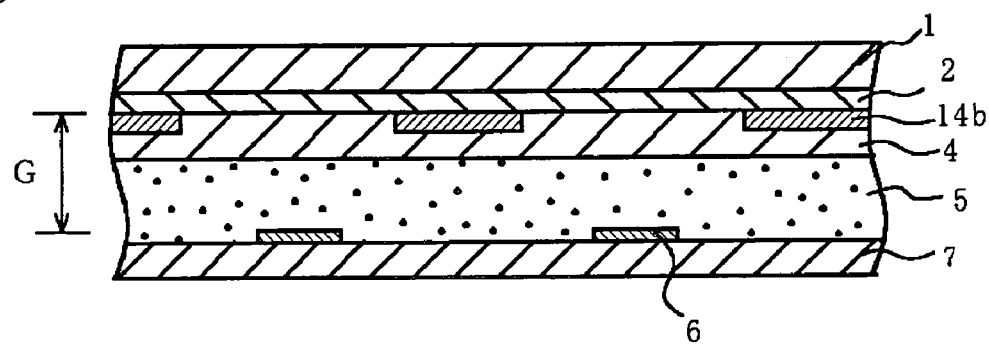
Figure 8C:
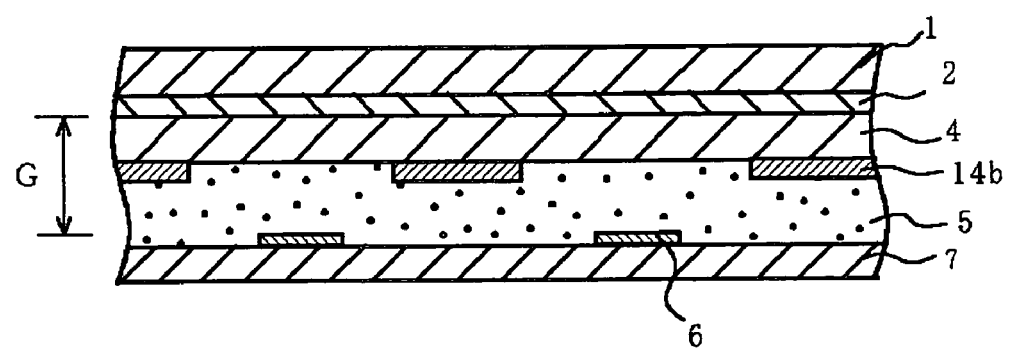

Unlikely to those described in the above, the display elements 18 shown in FIGS. 8B and 8C do not use the metal ion as the colorant material, but instead use an electrochromic (EC) layer 4 as a continuous layer of the colorant material, which is formed between the transparent pixel electrodes 2 and the polymer solid electrolyte layer 5 containing the electrolyte so as to join them.

In the display element 18, the insulating film 14b may be formed whichever on the transparent pixel electrodes 2 (FIG. 8B) and on the electrochromic (EC) layer 4 (FIG. 8C).

The transparent pixel electrodes 2 in the configurations shown in FIGS. 8B and 8C are brought into contact with the electrochromic (EC) layer 4, where the electrochromic layer 4 comprises an electrochromic material which is an electro-active polymer material.

The electrochromic layer 4 can change its color through electro-chemical oxidation or reduction by nature, and under a voltage-applied condition between the transparent pixel electrodes 2 and the other electrodes 6 so as to produce a potential difference therebetween, it typically turns into black B in the portion thereof on the transparent pixel electrodes 2 and within the area limited by the insulating film 14b. The black pattern can be observed in a displayed color from the transparent support 1 side. The electrochromic layer 4 in this case causes coloring only within the pixel area as being limited by the insulating film 14b, but decolors if the applied voltage is inverted.

The electrochromic material used herein may be any one of compounds selected from the group consisting of the tungsten oxide, spinel compound, viologen compound and electro-active polymer compound.

Also electro-conductive polymer obtained particularly by the electrolytic synthesis is also preferably used for the electrochromic layer 4. This is because the electro-conductive polymer can assist rapid donation and acceptance of electrons by virtue of its conductivity, and thus can allow rapid coloring and decoloring reactions.

Preferable examples of the polymer material are listed in Table 1 below, where they can be obtained by electrolytic oxidative polymerization of pyrrole, aniline, azulene, thiophene, indole, carbazole or derivatives thereof (average molecular weight is preferably within a range from 1,000 to 100,000). It is also allowable to use the polymer materials and their derivatives in combination (mixture).

TABLE 1

| Polymer | Oxidation potential (vs. Li$^+$/Li) | Reduction potential (vs. Li$^+$/Li) | Coulomb efficiency |
| --- | --- | --- | --- |
| polypyrrole | 2.85 | 2.6 | ≧99% |
| polyaniline | 4.2 | 4.0 | ≧99% |
| polyazulene | 3.6 | 3.2 | ≧99% |
| polythiophene | 4.5 | 3.6 | 96% |
| polyindole | 3.8 | 3.5 | 95% |
| polycarbazole | 3.7 | 3.6 | 81% |

Among the polymer materials (polypyrrole, polyaniline, polyazulene, polythiophene, polyindole, polycarbazole) listed in the table, especially preferable one is polypyrrole. This is because it has a low redox potential, a high Coulomb efficiency, a black displayed color when oxidized, and a long repetitive service life.

Materials having a lower redox potential are preferred because they are more stable in the colored status.

Materials having a higher Coulomb efficiency are preferred because they are more successful in suppressing adverse side reactions, where a Coulomb efficiency of polypyrrole of almost as high as 100% means that the adverse side reactions hardly occur and that the service life of the display element is successfully elongated.

The blackness of the color development under oxidation is an important feature for display of documents. Unlike other known polymers only capable of showing green or reddish black color, polypyrrole shows a true black under complete oxidation. Use of polypyrrole can thus increase the density of black color, and can also raise the contrast.

Long service life under repetitive use is also one of the valuable features of polypyrrole.

In the configuration where the polymer solid electrolyte layer 5 is formed in contact with the electrochromic layer 4 responsible for the coloring, a composite formation of the polymer electrolyte for composing the polymer solid electrolyte layer 5 and the electrochromic layer 4 comprising a polymer material as an electrochromic material is preferable, because the polymer material becomes less likely to cause falling from the electrode or pulverization due to change in the volume thereof under coloring and decoloring, and this improves the durability.

Thus-configured display element 18 can be driven by the active matrix system, and proper selection of the material for composing the electrochromic layer 4 can raise the contrast and black color density.

In addition, selective coloring is achieved by the electrochemical oxidation and reduction of the layer 4 containing the electrochromic material as the colorant material placed between the transparent pixel electrodes 2 and opposing electrodes 6, and the coloring is promoted by the polymer solid electrolyte layer 5. This also contributes to raising of the contrast and coloring density, and to avoid a problem of color fading after long-term use.

EXAMPLE 5

Figure 11:
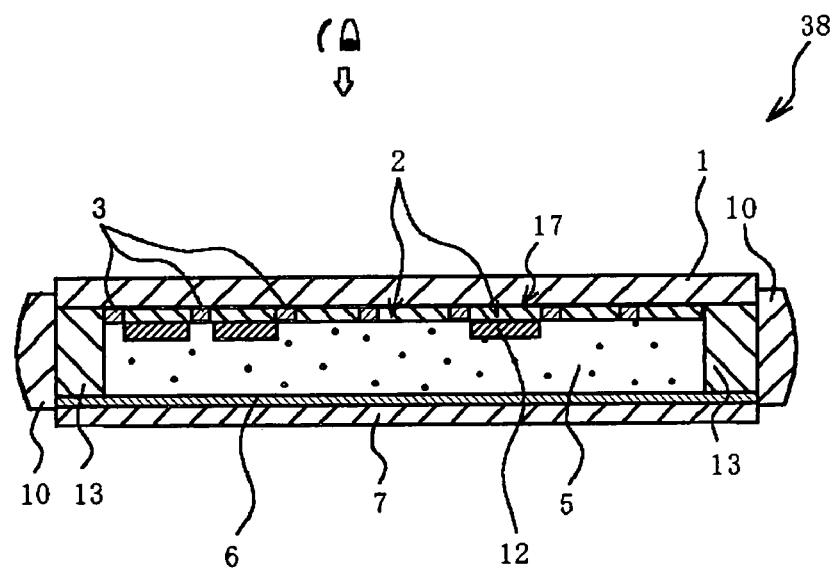
FIG. 11 is a sectional view of a conventional display element.
Figure 12A:
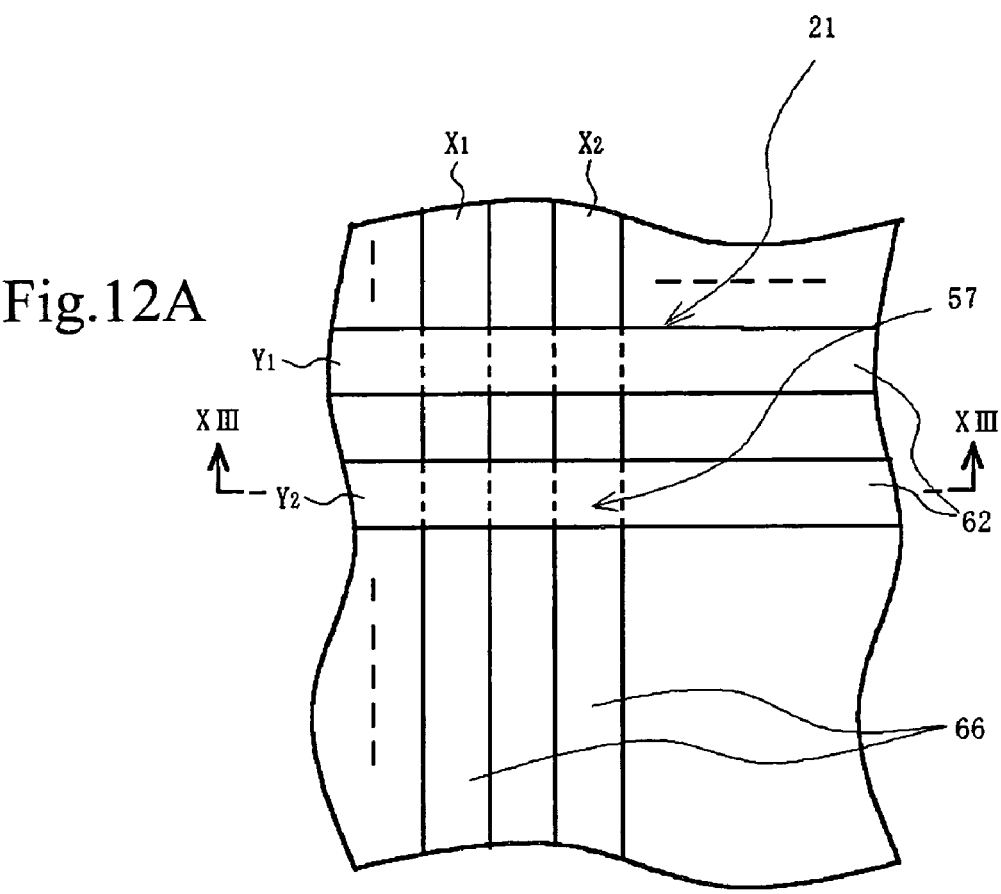
FIGS. 12A and 12B are plan views of the same display element and a generation status of crosstalk.
Figure 12B:
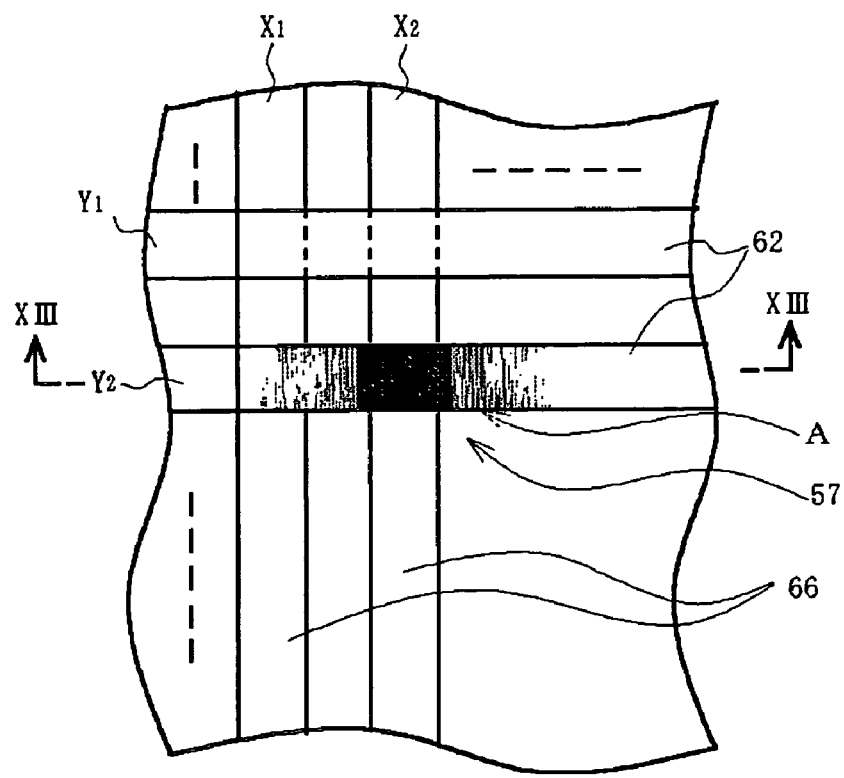
Figure 13:
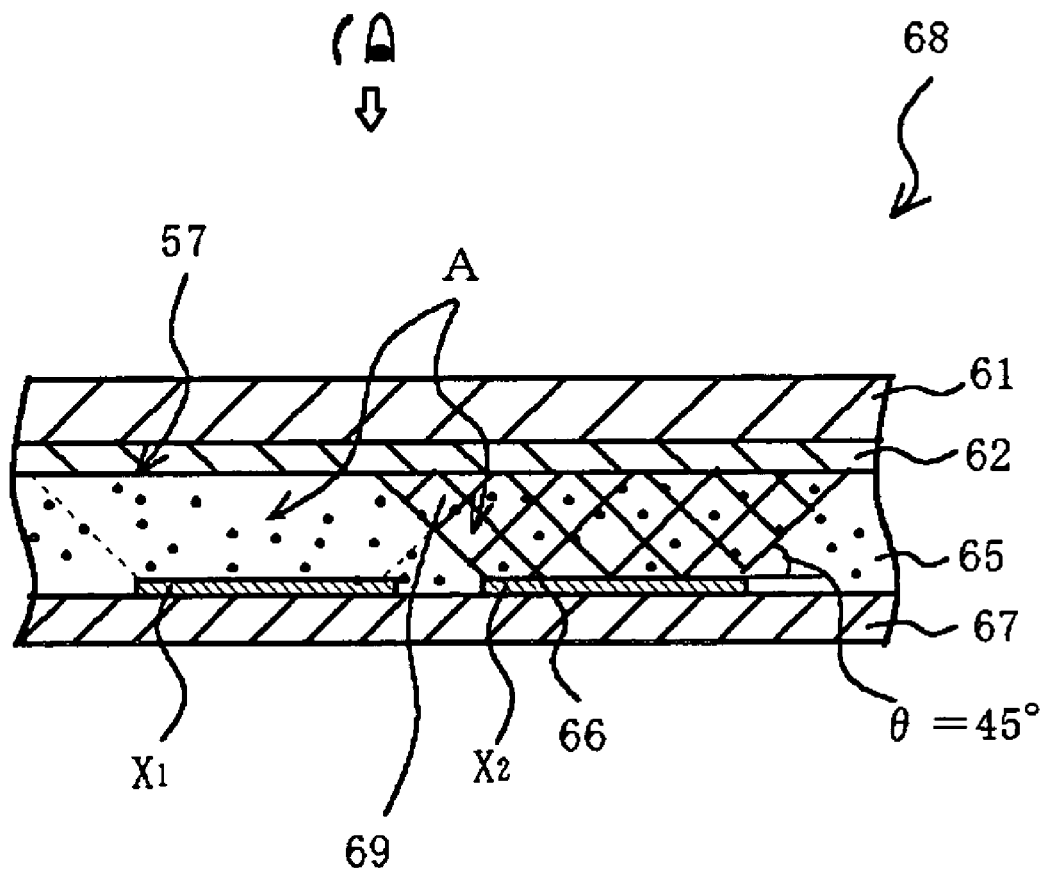
FIG. 13 is a sectional view taken along the line XIII—XIII indicated in FIGS. 12A and 12B.

First, a comparative display element 38 is shown in FIG. 11. The display element 38 is configured as a two-dimensional flat display in which a plurality of display element portions 17 are arranged in plane, where each display element portion 17 comprises the transparent pixel electrode 2 controlled by a thin-film transistor (TFT) 3 as a driving element; the polymer solid electrolyte layer 5 containing metal ion (electrolyte as the colorant material), a polymer electrolyte and a whitening agent; and the stripe-patterned opposing electrode 6 provided commonly for the individual pixels on one line and so as to oppose with the transparent pixel electrode 2.

In the display element 38, one pixel portion 17 is composed of a combination of the transparent pixel electrode 2 and the thin-film transistor (abbreviated as TFT, hereinafter) 3, and a plurality of this pixel portion 17 are arranged on the transparent support 1 so as to form a dot pattern (or matrix pattern).

The transparent pixel electrodes 2 comprise a transparent conductive film patterned into near rectangle or square, isolated for every pixel portion 17, and a part of which is provided with the TFT 3 for every pixel portion 17.

The TFT 3 provided for every pixel portion 17 is selected by a wiring not shown, to thereby control driving of the correspondent transparent pixel electrode 2. The TFT 3 is effective for preventing the crosstalk among the pixel portions 17. The TFT 3 is formed so as to occupy a corner of the transparent pixel electrode 2, where the transparent pixel electrode 2 may overlap the TFT 3.

The TFT 3 is connected with a gate line and a data line, where the gate electrode of the TFT 3 is connected to each gate line, one of the source-and-drain regions of the TFT 3 is connected to each data line, and another one of the source-and-drain regions is electrically connected to the transparent pixel electrode 2.

In the display element 38, a metal ion (electrolyte) is contained as the colorant material in the polymer solid electrolyte layer 5, and is responsible for color change. The metal ion (electrolyte) used for the color change, such as silver halide, can cause electrolytic plating (coloring) 12 which is decoloring or electrochemical deposition, and dissolution (decoloring) which is a reverse reaction in a reversible manner, and this realizes the display. The colored pattern is typically formed by deposited silver, and is visually observable as a displayed color from the transparent support 1 side.

The opposing electrodes 6 are formed on the side opposing to the transparent pixel electrode 2, and a support 7 is provided in order to support the opposing electrodes 6. It is not always necessary for the support 7 to be transparent since it is not provided on the pixel portion 17 side, and any substrates, films and the like capable of exactly holding the opposing electrodes 6 and the polymer solid electrolyte layer 5 are available. In order to oppose the transparent pixel electrodes 2 with the electrodes 6, a seal resin portion 10 and a seal member 13 for holding both supports 1 and 7 are formed on the circumference. These seal resin portion 10 and seal member 13 are successful in exactly holding both supports 1 and 7, as well as the transparent pixel electrodes 2, TFTs 3, polymer solid electrolyte layer 5 and opposing electrodes 6 disposed therebetween.

Thus configured display element 38 can be driven by TFTs 3 based on the active matrix system, and this is successful in raising the contrast and coloring density based on deposition and dissolution of the metal ion (electrolyte) contained in the polymer solid electrolyte layer 5.

However in the display element 38, the TFT 3 which cannot serve as the display portion is provided on the transparent pixel electrode 2 side, and this undesirably reduces the size of area of the pixel portion 17 to thereby lower the aperture ratio, and adversely affect the brightness of the pixel portion 17.

Figure 9:
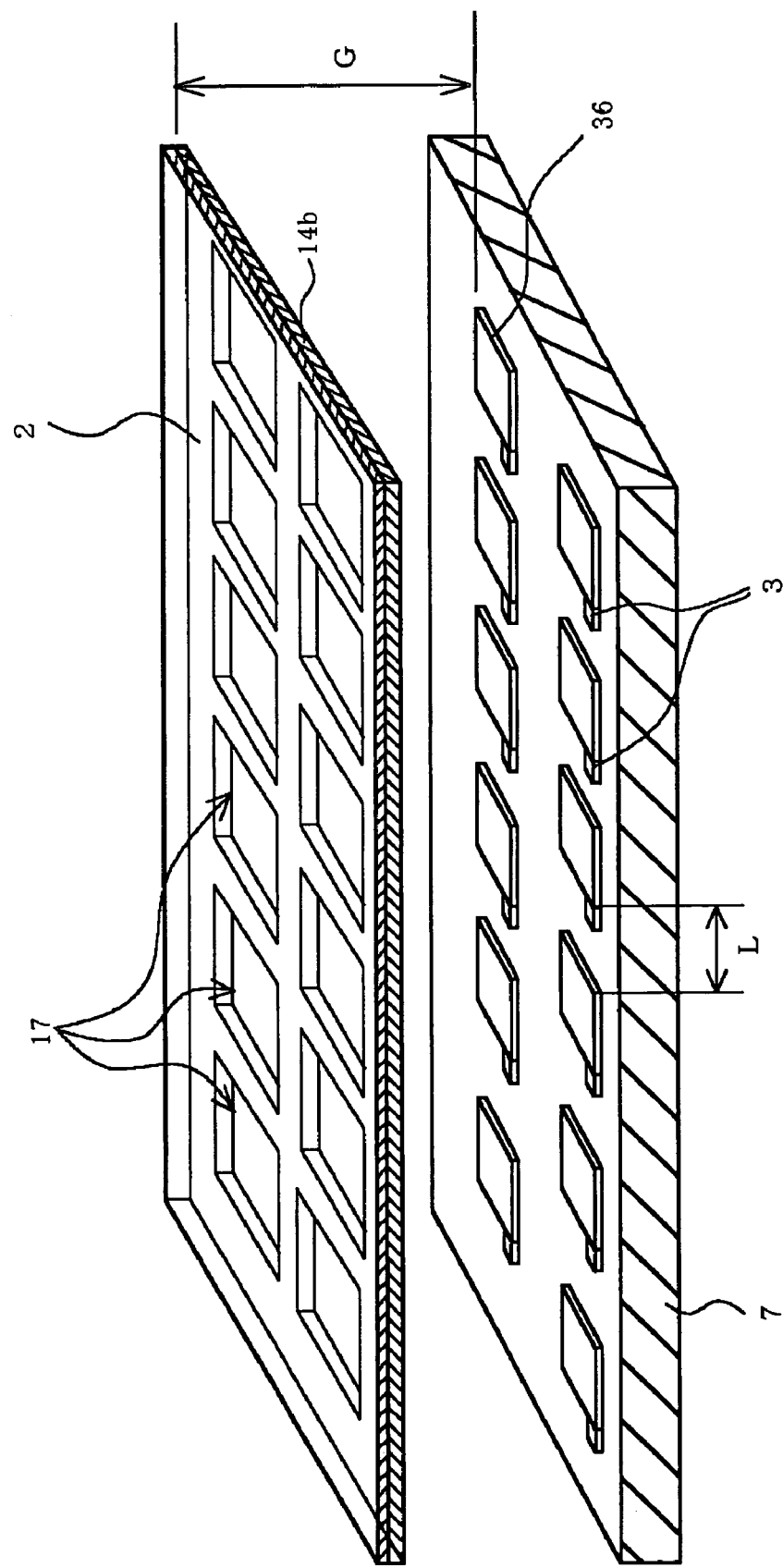
FIG. 9 is a perspective view of a display element of still another embodiment of the present invention.
Figure 10A:
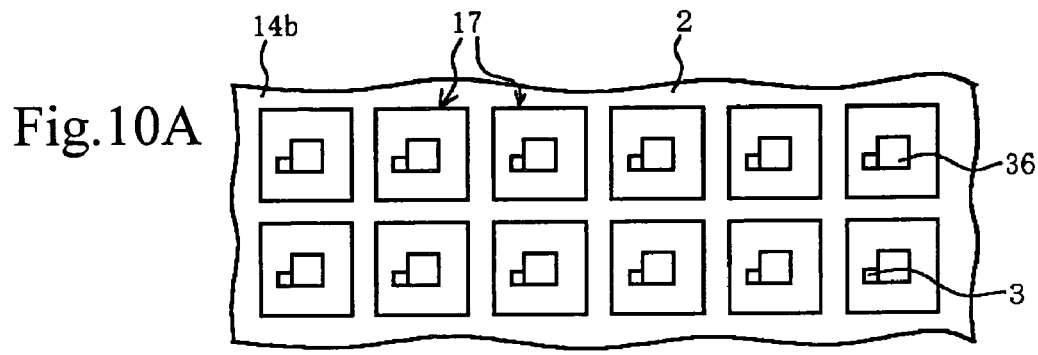
FIGS. 10A and 10B are a plan view and a sectional view of the same display element.
Figure 10B:
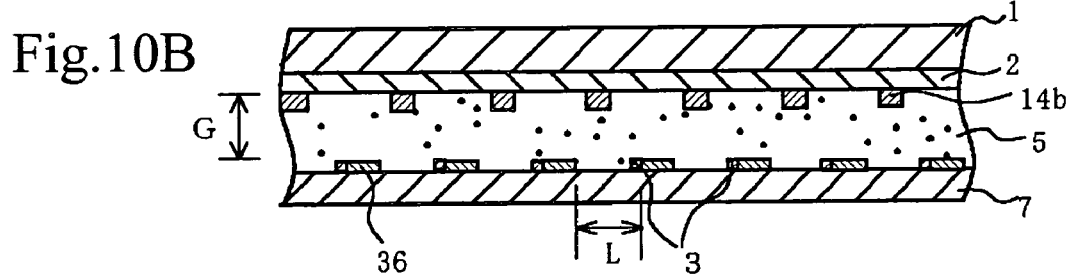

To avoid the adverse effect, this embodiment adopts the display element 18 described above in Example 3 having a dot-patterned arrangement (stripe-patterned one also permissible) of the electrodes as shown in FIGS. 9, 10A and 10B, in which the distance L between the effective electrode planes of the adjacent drive electrodes (opposing electrodes) 36 is increased so that at least the TFTs 3 can be formed therein (where, L≧G and/or l=L+a+b, l≧2G+b−2t), and the TFTs 3 are formed and connected to the side edge of the individual drive electrodes 36.

According to this configuration, the TFT 3 will never adversely affect the aperture ratio of the pixel portion 17 since the TFT 3 is not provided on the transparent pixel electrode 2 side, and this successfully raises the display efficiency (including brightness) of the pixel portion 17. In order to detect potential of the transparent pixel electrodes and drive electrode 36, it is preferable herein to use a third electrode which has completely no participation to the reaction.

Materials for composing the third electrode are preferably selected from metal materials which have no contribution to the reaction and are not causative of spontaneous dissolution into the polymer solid electrolyte layer 5 which is a medium placed between the transparent pixel electrodes 2 and drive electrodes 36, and can be selected from platinum, chromium, aluminum, cobalt, palladium, silver or the like, similarly to those for the drive electrodes.

The third electrode is preferably formed in the portion on the same plane with the transparent pixel electrodes 2 or the drive electrodes 36, but electrically isolated therefrom.

Next paragraphs will detail examples of the present invention.

IMPLEMENTATION EXAMPLE 1

The display element 18 similar to that descried above in Example 1 (FIG. 1A, FIGS. 4A to 4C, FIGS. 5A and 5B) was fabricated.

That is, on a 10 cm×10 cm polycarbonate substrate (transparent support 1) of 2 mm thick, stripe-patterned transparent pixel electrodes (display electrodes) 2 and the insulating film 14b were formed according to the procedures described in the next.

The width of the stripe was set to 150 μm, intervals of placement of the stripe to a 170-μm pitch, and the size of the openings (pixel portions 17 not covered with the insulating film 14b) to 140-μm square.

Next, an ITO film having a thickness of 500 nm and a sheet resistance of 12Ω/cm² was formed on the polycarbonate substrate (transparent support 1) by the sputtering process.

Next, on the ITO film, a photoresist is coated and patterned by photolithography so as to obtain a desired stripe form.

Next, the polycarbonate substrate was dipped into an ITO etching solution to thereby remove the ITO film in portions not covered with the photoresist. The photoresist was thereafter removed using an organic solvent such as acetone.

Next, on the stripe-patterned transparent pixel electrodes 2 (ITO film), an $SiO_2$ film which serves as the insulating film 14b was formed to a thickness of 200 nm by the plasma CVD process using TEOS($Si(OC_2H_5)_4$: tetraethoxy orthosilicate) and $O_2$.

Next, on the $SiO_2$ film, a photoresist was coated and patterned by lithography so as to obtain a desired pattern, and the substrate was then dipped into a mixed solution typically containing ammonium fluoride, hydrofluoric acid and so forth to thereby remove the $SiO_2$ film in portions not covered by the photoresist. The photoresist was thereafter removed using an organic solvent such as acetone, to thereby form the insulating film 14b into a predetermined pattern.

On the other hand, on a 10 cm×10 cm polycarbonate substrate (support 7) of 0.2 mm thick, the stripe-patterned metal electrodes (opposing electrodes) 6 and the insulating film 14a were formed according to the procedures described in the next. The size of the openings (portions not covered by the insulating film 14a) was set to 20 μm square.

First, an aluminum film of 300 nm thick was formed on the polycarbonate substrate (support 7) by the sputtering process.

Next, on the aluminum film, a photoresist is coated and patterned by photolithography so as to obtain a desired stripe form.

Next, the polycarbonate substrate was subjected to the RIE (reactive ion etching) process using a mixed gas of $BCl_3$ and $Cl_2$, to thereby etch off the aluminum film in portions not covered with the photoresist. The photoresist was thereafter removed using an organic solvent such as acetone.

Next, on the stripe-patterned aluminum film (opposing electrodes 6), an $SiO_2$ film which serves as the insulating film 14a was formed to a thickness of 200 nm by the plasma CVD process using TEOS ($Si(OC_2H_5)_4$: tetraethoxy orthosilicate) and $O_2$.

Next, on the $SiO_2$ film, a photoresist was coated and patterned by lithography so as to obtain a desired pattern, and the substrate was then dipped into a mixed solution typically containing ammonium fluoride, hydrofluoric acid and so forth to thereby remove the $SiO_2$ film by etching in portions not covered by the photoresist. The photoresist was thereafter removed using an organic solvent such as acetone, to thereby form the insulating film 14a into a predetermined pattern. Preparation and coating of the polymer electrolyte will be described in the next.

First, one part by weight of polyvinyl alcohol having a molecular weight of approximately 350,000, ten parts by weight of an 1:1 mixed solvent of water and isopropanol, 1.7 parts by weight of lithium bromide (support electrolyte) and 1.7 parts by weight of bismuth chloride (colorant material) were mixed, and the mixed solution was then heated to 120° C. to thereby prepare a homogeneous solution.

Next, the solution was added with 0.2 parts by weight of titanium dioxide having an average particle size of 0.5 μm, and allowed to uniformly disperse using a homogenizer. The dispersion was then coated on the transparent substrate (having the transparent pixel electrodes 2 formed thereon) by the doctor blade process to a thickness of 60 μm, the substrate having the opposing electrodes 6 formed thereon was immediately bonded, and the bonded substrates were then allowed to dry at 110° C. under a reduced pressure of 0.1 MPa for one hour, to thereby form the gelated polymer solid electrolyte layer 5 between both electrodes. The end plane of the bonded substrates were sealed using the seal member 13 and the seal resin portion 10.

Thus fabricated display element 18 (ion-conduction-type display) was such as being configured as shown in FIG. 1A to 1C.

The display element 18 was found to have L of 150 µm, l of 200 µm, t of 200 nm, b of 20 µm, and G of approximately 60 µm (precisely 59.5 µm), and was found to satisfy L≧=G−t, which is a crosstalk-preventive condition.

<Evaluation of Display Characteristics>

A desired set of the stripe-patterned electrodes (transparent pixel electrode and opposing electrode) was selected by a publicly-known method, and coloring was effected by applying a constant voltage of 1.2 to 1.5 V per one pixel portion 17 to the transparent pixel electrode 2 (display electrode) at a quantity of electricity of 5 µC for 0.1 seconds, to thereby allow the reduction reaction to proceed at the transparent pixel electrode 2 (display electrode), whereas decoloring was achieved by proceeding oxidation reaction at the same amount of electricity. The colored display and blank (white) display were switched in this way.

Consequently, the reflectivity for the blank (white) display was found to be 70%, and the optical density (OD) of the display portion for the colored (black) display was found to be approximately 1.4 (reflectivity=4%). No coloring or decoloring in any of non-selected pixels was observed.

The display element was brought into the colored status and was then allowed to stand with its circuit kept open. No changes in the optical density of the display portion were observed even after one week, which proved the memory effect of the element.

A repetitive coloring/decoloring cycle test showed that the black color density during the coloring was lowered to as low as 1.0 or below (practically 1.5 or above is preferable) only after the cycle was repeated 8 million times or around, which proved an excellent characteristic.

IMPLEMENTATION EXAMPLE 2

In this example, a display element was fabricated similarly to as described in Implementation Example 1, except that a tungsten oxide film as the electrochromic layer (EC) 4 of 1 µm thick was formed on the transparent pixel electrodes 2 by sputtering, and that the processes described below were carried out.

That is, in the preparation and coating of the polymer solid electrolyte, one part by weight of poly(vinylidene fluoride) having a molecular weight of approximately 350,000, ten parts by weight of acetonirile, and 1.7 parts by weight of potassium thiocyanate (KSCN) were mixed, and the mixture was then heated to 120° C. to thereby prepare a homogeneous solution.

The solution was added with 0.2 parts by weight of titanium dioxide having an average particle size of 0.5 µm, and allowed to uniformly disperse using a homogenizer. The dispersion was then coated on the substrate (transparent pixel electrodes 2) by the doctor blade process to a thickness of 20 µm, and then allowed to dry at 150° C., 0.1 MPa for 24 hours under reduced pressure to thereby form the polymer solid electrolyte. Except for these processes, the same processes were applied to thereby fabricate the display element 18 configured as shown in FIG. 8B (also L and l may be same as those in Implementation Example 1).

<Evaluation of Display Characteristics>

Measurement similarly proceeded as described in Implementation Example 1 revealed a reflectivity during the blank (white) display of 70%, and an optical density (OD) of the display portion during the colored (blue) display of approximately 1.3 (reflectivity=4%). No coloring or decoloring in any of non-selected pixels was observed.

The display element was brought into the colored status and was then allowed to stand with its circuit kept open. No changes in the optical density of the display portion were observed even after one week, which proved the memory effect of the element.

A repetitive coloring/decoloring cycle test showed that the black color density during the coloring was lowered to as low as 1.0 or below only after the cycle was repeated 8 million times or around, which proved an excellent characteristic.

IMPLEMENTATION EXAMPLE 3

In this example, a display device similar to the display element 18 shown in FIGS. 9, 10A and 10B was fabricated similarly to as described in Implementation Example 1, except that a 10 cm×10 cm glass substrate of 1.1 mm thick, having on one entire surface thereof a transparent conductive film (ITO) having a sheet resistance of 7Ω/cm$^2$ was used, that 140-µm-square openings were two-dimensionally arranged thereon at 170 µm (150 dpi) intervals, and that a 10 cm×10 cm glass substrate of 1.1 mm thick, on which 20-µm-square drive electrodes 36 (ITO film) and TFTs 3 are formed by publicly-known methods so as to be arranged at 170 µm pitches in a two-dimensional manner, was used.

<Evaluation of Display Characteristics>

A measurement carried out similarly to as described in Implementation Example 1 showed a reflectivity of as large as 70%, which was similar to the value in Implementation Example 1, for the blank (white) display since the element has no TFTs on the display electrode side. The optical density (OD) of the display portion for the colored (black) display was found to be approximately 1.4 (reflectivity=4%). No coloring or decoloring in any of non-selected pixels was observed.

The display element was brought into the colored status and was then allowed to stand with its circuit kept open. No changes in the optical density of the display portion were observed even after one week, which proved the memory effect of the element.

A repetitive coloring/decoloring cycle test showed that the black color density during the coloring was lowered to as low as 1.0 or below only after the cycle was repeated 8 million times or around, which proved an excellent characteristic.

COMPARATIVE EXAMPLE 1

A display similar to that in Implementation Example 1 was fabricated except that the thickness G of the polymer solid electrolyte layer 5 was altered to 120 µm. In the display element 18, the condition of L≧G−t was not satisfied, whereas L<G−t held.

When the display element was driven under the same conditions as in Implementation Example 1 while bringing one pixel portion 17 into the colored status and leaving the adjacent pixel portions 17 not colored, the areas of the adjacent pixel portions facing to the colored pixel portion 17 was found to cause coloring over a width of approximately 10 µm, which indicated the crosstalk.

COMPARATIVE EXAMPLE 2

A display similar to that in Comparative Example 1 was fabricated except that the insulating films 14*b* and 14*a* were formed neither on the pixel electrodes 2 nor on the opposing electrodes 6. In this display element 18, the condition of L≧2G was not satisfied, whereas L<2G held.

When the display element was driven under the same conditions as in Implementation Example 1 while bringing one pixel portion 17 into the colored status and leaving the adjacent pixel portions 17 not colored, the colored area was found to gradually expand during the voltage application, exceeding a target size of 140 μm (pixel portion 17), and reached 170 μm after 0.1 seconds.

The embodiments and implementation examples described in the above may further be modified based on the technical spirit of the present invention.

For example, the patterns, sizes and materials of the insulating films 14*a*, 14*b* in the aforementioned display element 18 are not limited to those described in the above. Although the display element 18 allows viewing only from the transparent pixel electrodes 2 side due to opacity of the material on the opposing electrodes 6 side, it is also allowable to make the display element 18 into of transparent type by adopting transparent materials for the opposing electrodes 6 and support 7, to thereby make the element visible not only from one side, but from both sides.

As has been described in the above, in the present invention, electrode at least on one side is covered with the insulating material an insulating material in an area exclusive of at least the pixel area, and the distance L between the effective electrode planes of the adjacent first electrodes is set twice or more as large as the distance G between the second electrode and the effective electrode plane of the first electrode, so that the ions which diffuse and migrate from the side of the individual first electrodes towards the second electrode side are effectively prevented from otherwise diffusing out into the areas around the pixel area on the second electrode side by virtue of the insulating material, or the ions are effectively prevented from invading the adjacent pixels. This successfully results in coloring of desired pixels to a satisfactory level, preventing overlapping of the ion diffusion ranges among the pixels, avoiding coloring of the pixels not desired to be colored, and obtaining high-quality and sharp display free from crosstalk, color blurring and color mixing.

Moreover, the coloring and decoloring are effected based on electrochemical reduction and oxidation of the colorant material between the first electrodes and second electrodes, and the polymer electrolyte can promote these changes and assist the ion transfer. This is successful in proceeding the coloring and decoloring in a rapid and thorough manner even under a low energy supply, raising the contrast and coloring density (black density, for example), avoiding problems in color fading or the like even after a long-term use by virtue of the memory effect, and allowing simple matrix driving.

The invention claimed is:

1. A display element having a colorant material capable of causing deposition, dissolution or color change based on electrochemical reduction or oxidation and a polymer solid electrolyte disposed between first electrodes and second electrodes, and at least either one of these electrodes is covered with an insulating material in an area exclusive of at least the pixel area, said display element assumed as having a part of at least said second electrodes thereof covered with said insulating material satisfies either one of the relations below:

$$L \geq G \text{ and } L \geq G-t$$

where, L represents the distance between the effective electrode planes of the adjacent first electrodes, t represents the thickness of said insulating material on the second electrode side, and G represents the distance between the second electrode surface and said effective electrode plane of said first electrode.

2. A display element having a colorant material capable of causing deposition, dissolution or color change based on electrochemical reduction or oxidation and a polymer solid electrolyte disposed between first electrodes and second electrodes, and at least either one of these electrodes is covered with an insulating material in an area exclusive of at least the pixel area, said display element, assumed as having a part of at least said second electrodes thereof covered with said insulating material in an area exclusive of at least the pixel area, satisfies the relation below:

$$l = L + a + b$$

where, L represents the distance between the effective electrode planes of the adjacent first electrodes, b represents the effective electrode width of said first electrode, l represents the distance between the outer ends of said insulating material located around the pixels on said second electrode, and a represents the width of said insulating material.

3. A display element having a colorant material capable of causing deposition, dissolution or color change based on electrochemical reduction or oxidation and a polymer solid electrolyte disposed between first electrodes and second electrodes, and satisfying the relation below:

$$L \geq 2G$$

where, L represents the distance between the effective electrode planes of the adjacent first electrodes, and G represents the distance between the second electrode surface and said effective electrode plane of said first electrode.

4. The display element as claimed in claim 3, wherein said first electrodes and said second electrodes are respectively formed on predetermined substrates at predetermined intervals, and said first and second electrodes are disposed so as to oppose with each other while placing said electrolyte in between.

5. The display element as claimed in claim 4, wherein said first and second electrodes are covered with said insulating material in an area exclusive of at least the intersectional portion.

6. The display element as claimed in claim 5, wherein said first and second electrodes are formed with a stripe pattern, and these stripe-patterned electrodes are same or different in the size of area having no insulating material formed therein.

7. The display element as claimed in claim 3, wherein said first electrodes are formed as pixel electrodes periodically arranged on a predetermined substrate, and said second electrodes opposing therewith are covered with said insulating material in an area exclusive of portions corresponded to the pixels.

8. The display element as claimed in claim 3, wherein said display element has a colorant material capable of causing deposition, dissolution or color change based on electrochemical reduction or oxidation and a polymer solid electrolyte disposed between first electrodes and second electrodes, at least either one of said electrodes is covered with a continuous layer of said colorant material, and at least either one of said electrodes is covered with said insulating material so as to allow said colorant material layer to contact with said electrolyte in an area exclusive of the pixel area.

9. The display element as claimed in claim 3, wherein said colorant material is a metal ion or electrochromic material.

10. The display element as claimed in claim 9, wherein said metal ion is at least any one of cations selected from the group containing silver, bismuth, chromium, iron, nickel and cadmium.

11. The display element as claimed in claim 9, wherein said electrochromic material is formed as a continuous layer on the surface of at least either one of said first and second electrodes.

12. The display element as claimed in claim 9, wherein said electrochromic material is at least any one of compounds selected from the group consisting of tungsten oxide, spinel compound, viologen compound and electro-active polymer material.

13. The display element as claimed in claim 3, wherein said second electrodes are formed so as to form a display pattern.

14. The display element as claimed in claim 13, wherein said first electrodes are connected to drive transistors formed on the same substrate.

15. A display element according to claim 3, wherein said first electrodes are formed as pixel electrodes periodically arranged on a predetermined substrate, and said second electrodes opposing therewith are covered with said insulating material in an area exclusive of portions corresponded to the pixels, and wherein the area of said second electrodes not covered with said insulating material is larger than the effective electrode area of said first electrodes which serve as the pixels.

16. A display element according to claim 3, wherein said display element has a colorant material capable of causing deposition, dissolution or color change based on electrochemical reduction or oxidation and a polymer solid electrolyte disposed between first electrodes and second electrodes, at least either one of said electrodes is covered with a continuous layer of said colorant material, and at least either one of said electrodes is covered with said insulating material so as to allow said colorant material layer to contact with said electrolyte in an area exclusive of the pixel area, and wherein the portions of said colorant material layer not covered with said insulating material are formed at predetermined intervals, and disposed so as to cross the opposing electrodes formed at predetermined intervals.

17. A display element according to claim 3, wherein said colorant material is a metal ion or electrochromic material, wherein said electrochromic material is at least any one of compounds selected from the group consisting of tungsten oxide, spinel compound, viologen compound and electro-active polymer material, and wherein said electro-active polymer material is at least any one compound selected from the group containing polypyrrole, polyazulene, polythiophene and polyaniline.

18. A display element having a colorant material capable of causing deposition, dissolution or color change based on electrochemical reduction or oxidation and an electrolyte disposed between first electrodes and second electrodes, and at least either one of these electrodes is covered with an insulating material in an area exclusive of at least the pixel area, wherein said first electrodes are formed as pixel electrodes periodically arranged on a predetermined substrate, and said second electrodes opposing therewith are covered with said insulating material in an area exclusive of portions corresponded to the pixels, and wherein the area of said second electrodes not covered with said insulating material is larger than the effective electrode area of said first electrodes which serve as the pixels.

19. A display element having a colorant material capable of causing deposition, dissolution or color change based on electrochemical reduction or oxidation and an electrolyte disposed between first electrodes and second electrodes, and at least either one of these electrodes is covered with an insulating material in an area exclusive of at least the pixel area, wherein said display element has a colorant material capable of causing deposition, dissolution or color change based on electrochemical reduction or oxidation and a polymer solid electrolyte disposed between first electrodes and second electrodes, at least either one of said electrodes is covered with a continuous layer of said colorant material, and at least either one of said electrodes is covered with said insulating material so as to allow said colorant material layer to contact with said electrolyte in an area exclusive of the pixel area, and wherein the portions of said colorant material layer not covered with said insulating material are formed at predetermined intervals, and disposed so as to cross the opposing electrodes formed at predetermined intervals.

20. A display element having a colorant material capable of causing deposition, dissolution or color change based on electrochemical reduction or oxidation and an electrolyte disposed between first electrodes and second electrodes, and at least either one of these electrodes is covered with an insulating material in an area exclusive of at least the pixel area, wherein said colorant material is a metal ion or electrochromic material, wherein said electrochromic material is at least any one of compounds selected from the group consisting of tungsten oxide, spinel compound, viologen compound and electro-active polymer material, and wherein said electro-active polymer material is at least any one compound selected from the group containing polypyrrole, polyazulene, polythiophene and polyaniline.

* * * * *